(12) United States Patent
Liu et al.

(10) Patent No.: US 11,810,291 B2
(45) Date of Patent: Nov. 7, 2023

(54) MEDICAL IMAGE SYNTHESIS OF ABNORMALITY PATTERNS ASSOCIATED WITH COVID-19

(71) Applicant: Siemens Healthcare GmbH, Erlangen (DE)

(72) Inventors: Siqi Liu, Princeton, NJ (US); Bogdan Georgescu, Princeton, NJ (US); Zhoubing Xu, Plainsboro, NJ (US); Youngjin Yoo, Princeton, NJ (US); Guillaume Chabin, Paris (FR); Shikha Chaganti, Princeton, NJ (US); Sasa Grbic, Plainsboro, NJ (US); Sebastien Piat, Lawrence Township, NJ (US); Brian Teixeira, Lawrence Township, NJ (US); Thomas Re, Monroe, NJ (US); Dorin Comaniciu, Princeton Junction, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 16/865,266

(22) Filed: May 1, 2020

(65) Prior Publication Data
US 2021/0327054 A1 Oct. 21, 2021

Related U.S. Application Data

(60) Provisional application No. 63/010,198, filed on Apr. 15, 2020.

(51) Int. Cl.
*G06T 7/00* (2017.01)
*G06T 7/11* (2017.01)
*G06T 17/20* (2006.01)

(52) U.S. Cl.
CPC .............. *G06T 7/0012* (2013.01); *G06T 7/11* (2017.01); *G06T 17/205* (2013.01);
(Continued)

(58) Field of Classification Search
CPC ....... G06T 7/0012; G06T 17/205; G06T 7/11; G06T 2207/20081; G06T 2207/10081; G06T 2207/20084; G06T 2207/30061
See application file for complete search history.

(56) References Cited

U.S. PATENT DOCUMENTS 7,196,328 B1   3/2007   Kley
8,731,255 B2   5/2014   El-Baz
(Continued)

FOREIGN PATENT DOCUMENTS

CN   107997778 A   5/2018
CN   109410188 A   3/2019
(Continued)

OTHER PUBLICATIONS

Yang, Jie, et al. "Class-aware adversarial lung nodule synthesis in CT images." 2019 IEEE 16th International Symposium on Biomedical Imaging (ISBI 2019). IEEE, 2019. https://ieeexplore.ieee.org/abstract/document/8759493 (Year: 2019).*
(Continued)

*Primary Examiner* — John Villecco
*Assistant Examiner* — Han Hoang

(57) ABSTRACT

Systems and methods for generating a synthesized medical image are provided. An input medical image is received. A synthesized segmentation mask is generated. The input medical image is masked based on the synthesized segmentation mask. The masked input medical image has an unmasked portion and a masked portion. An initial synthesized medical image is generated using a trained machine learning based generator network. The initial synthesized
(Continued)

medical image includes a synthesized version of the unmasked portion of the masked input medical image and synthesized patterns in the masked portion of the masked input medical image. The synthesized patterns is fused with the input medical image to generate a final synthesized medical image.

13 Claims, 17 Drawing Sheets

(52) U.S. Cl.
CPC .............. *G06T 2207/10081* (2013.01); *G06T 2207/20081* (2013.01); *G06T 2207/20084* (2013.01); *G06T 2207/30061* (2013.01)

(56) References Cited

U.S. PATENT DOCUMENTS

| | | |
|---|---|---|
| 10,039,515 B2 | 8/2018 | Porter et al. |
| 10,582,907 B2 | 3/2020 | Chen et al. |
| 2004/0086162 A1 | 5/2004 | Doi et al. |
| 2006/0018524 A1 | 1/2006 | Suzuki et al. |
| 2008/0040083 A1 | 2/2008 | Odry et al. |
| 2011/0237938 A1 | 9/2011 | Mizuno et al. |
| 2017/0177942 A1 | 6/2017 | Rao et al. |
| 2019/0050534 A1 | 2/2019 | Apte et al. |
| 2019/0066281 A1* | 2/2019 | Zheng ............... G06T 5/006 |
| 2020/0085382 A1* | 3/2020 | Taerum ............... G06T 7/30 |
| 2020/0090350 A1* | 3/2020 | Cho ............... G06T 7/136 |
| 2020/0211694 A1 | 7/2020 | Nye et al. |
| 2020/0401469 A1 | 12/2020 | Andelkovic et al. |
| 2021/0233247 A1 | 7/2021 | Cao et al. |
| 2022/0351379 A1 | 11/2022 | Lorsakul et al. |

FOREIGN PATENT DOCUMENTS

| | | |
|---|---|---|
| CN | 109872333 A | 6/2019 |
| CN | 110223352 A | 9/2019 |
| RU | 2637171 C1 | 11/2017 |
| WO | WO 2018015414 A1 | 1/2018 |

OTHER PUBLICATIONS

Pan, Feng, et al. "Time course of lung changes at chest CT during recovery from coronavirus disease 2019 (COVID-19)." Radiology 295.3 (2020): 715-721. https://pubs.rsna.org/doi/full/10.1148/radiol.2020200370 (Year: 2020).*

Li, Guangxu, et al. "Statistical shape model building method using surface registration and model prototype." Optics & Laser Technology 110 (2019): 234-238. https://www.sciencedirect.com/science/article/pii/S0030399217311283 (Year: 2019).*

Liu, Siqi, et al. "Decompose to manipulate: manipulable object synthesis in 3D medical images with structured image decomposition." arXiv preprint arXiv:1812.01737 (2018). https://arxiv.org/abs/1812.01737 (Year: 2019).*

John Hopkins University (JHU), "COVID-19 Dashboard Statistics", retrieved online at https://gisanddata.maps.arcgis.com/apps/opsdashboard/index.html, May 1, 2020, 1 pg.

Bernheim et al., "Chest CT Findings in Coronavirus Disease-19 (COVID-19): Relationship to Duration of Infection", Radiology, 2020, p. 200463, 19 pgs.

Chung et al., "CT Imaging Features of 2019 Novel Coronavirus (2019-nCOV)", Radiology, 2020, 19 pgs.

Zhao et al., "Relation Between Chest CT Findings and Clinical Conditions of Coronavirus Disease (COVID-19) Pneumonia: A Multicenter Study", American Journal of Roentgenology, Cardiopulmonary Imaging, May 2020, pp. 1-6.

Kanne et al., "Essentials for Radiologists on COVID-19: An Update-Radiology Scientific Expert Panel", Radiology, 2020, 4 pgs.

Guan et al., "Clinical Characteristics of Coronavirus Disease 2019 in China", New England Journal of Medicine, 2020, pp. 1-13.

Mizumoto et al., "Estimating the Asymptomatic Proportion of Coronavirus Disease 2019 (COVID-19) Cases on Board the Diamond Princess Cruise Ship, Yokohama, Japan, 2020", Eurosurveillance, vol. 25, No. 10, 2020, pp. 1-5.

Ji et al., "Potential Association Between COVID-19 Mortality and Health-Care Resource Availability", The Lancet Global Health, vol. 8, No. 4, 2020, p. e480.

Emanuel et al., "Fair Allocation of Scarce Medical Resources in the Time of COVID-19", New England Journal of Medicine, 2020, pp. 1-7.

Fang et al., "Sensitivity of Chest CT for COVID-19: Comparison to RT-PCR", Radiology, 2020, 8 pgs.

Ai et al., "Correlation of Chest CT and RT-PCR Testing in Coronavirus Disease 2019 (COVID-19) in China: A Report of 1014 Cases", Radiology, 2020, 23 pgs.

Rubin et al., "The Role of Chest Imaging in Patient Management during the COVID-19 Pandemic: A Multinational Consensus Statement from the Fleischner Society", Chest, 2020, pp. 1-24.

Shan et al., "Lung Infection Quantification of COVID-19 in CT Images with Deep Learning", arXiv preprints, arXiv:2003.04655, 2020, 19 pgs.

Li et al., "Artificial Intelligence Distinguishes COVID-19 from Community Acquired Pneumonia on Chest CT", Radiology, 2020, 16 pgs.

Wang et al., "A Deep Learning Algorithm Using CT Images to Screen for Corona VirusDisease (COVID-19)", medRxiv, 2020, pp. 1-19.

Xu et al., "Deep Learning System to Screen Coronavirus Disease 2019 Pneumonia", arXiv e-prints, arXiv:2002.09334, 2020, pp. 1-29.

Gozes et al., "Rapid AI Development Cycle for the Coronavirus (COVID-19) Pandemic: Initial Results for Automated Detection & Patient Monitoring using Deep Learning CT Image Analysis", arXiv preprint arXiv:2003.0537, 2020, 22 pgs.

Nie et al., "Medical Image Synthesis with Context-Aware Generative Adversarial Networks", International Conference on Medical Image Computing and Computer-Assisted Intervention, Springer, 2017, arXiv e-prints, arXiv:1612.05362v1, Dec. 16, 2016, 12 pgs.

Inui et al., "Chest CT Findings in Cases from the Cruise Ship "Diamond Princess" with Coronavirus Disease 2019 (COVID-19)", Radiology: Cardiothoracic Imaging, 2020, vol. 2, No. 2, 17 pgs.

Chartsias et al., "Adversarial Image Synthesis for Unpaired Multi-Modal Cardiac Data", International Workshop on Simulation and Synthesis in Medical Imaging, Springer, 2017, pp. 1-10.

Wang et al., "Unsupervised Learning for Cross-Domain Medical Image Synthesis using Deformation Invariant Cycle Consistency Networks", International Workshop on Simulation and Synthesis in Medical Imaging, Springer, arXiv e-prints, arXiv:1808.03944v1, Aug. 12, 2018, 10 pgs.

Yang et al., "Unpaired Brain MR-to-CT Synthesis using a Structure-Constrained CycleGAN", in Deep Learning in Medical Image Analysis and Multimodal Learning for Clinical Decision Support, Springer, arXiv e-prints, arXiv:1809.04536v1, Sep. 12, 2018, 8 pgs.

Yang et al., "Class-Aware Adversarial Lung Nodule Synthesis in CT Images", IEEE 16th International Symposium on Biomedical Imaging (ISBI 2019), IEEE, 2019, pp. 1348-1352.

Liu et al., "Decompose to Manipulate Object Synthesis in 3D Medical Images with Structured Image Decomposition", arXiv e-prints, arXiv:1812.01737v2, Feb. 7, 2019, 8 pgs.

Jin et al., "CT-Realistic Lung Nodule Simulation from 3D Conditional Generative Adversarial Networks for Robust Lung Segmentation", MICCAI, arXiv e-prints, arXiv: 1806.04051v1, Jun. 11, 2018, 8 pgs.

Xu et al., "Tunable CT Lung Nodule Synthesis Conditioned on Background Image and Semantic Features", International Workshop on Simulation and Synthesis in Medical Imaging, Springer, 2019, pp. 62-70.

Xu et al., "Correlation Via Synthesis: End-to-End Nodule Image Generation and Radiogenomic Map Learning Based on Generative Adversarial Network", arXiv e-prints, arXiv:1907.03728v1, Jul. 8, 2019, 8 pgs.

(56) References Cited

OTHER PUBLICATIONS

Sao et al., "Augmenting LIDC Dataset Using 3D Generative Adversarial Networks to Improve Lung Nodule Detection", Medical Imaging 2019: Computer-Aided Diagnosis, International Society for Optics and Photonics, 2019, vol. 10950, pp. 1-10.
Han et al., "Synthesizing Diverse Lung Nodules Wherever Massively: 3D Multi-Conditional GAN-based CT Image Augmentation for Object Detection", International Conference on 3D Vision (3DV), IEEE, arXiv e-prints, arXiv: 1906.04962, Aug. 12, 2019, 9 pgs.
Wang et al., "WGAN-Based Synthetic Minority Over-Sampling Technique: Improving Semantic Fine-Grained Classification for Lung Nodules in CT Images", IEEE Access, Jan. 30, 2019, vol. 7, pp. 18450-18463.
Liu et al., "No Surprises: Training Robust Lung Nodule Detection for Low-Dose CT Scans by Augmenting with Adversarial Attacks", arXiv e-prints, arXiv:2003.03824, Mar. 8, 2020, 10 pgs.
Shin et al., "Medical Image Synthesis for Data Augmentation and Anonymization Using Generative Adversarial Networks", arXiv e-prints, arXiv:1807.10225v2, Sep. 13, 2018, 11 pgs.
Frid-Adar et al., "GAN-based Synthetic Medical Image Augmentation for Increased CNN Performance in Liver Lesion Classification", Mar. 3, 2018, IEEE, arXiv e-prints, arXiv:1803.01229v1, 10 pgs.
Ronneberger et al., "U-Net: Convolutional Networks for Biomedical Image Segmentation", in International Conference on Medical Image Computing and Computer-Assisted Intervention, Springer, 2015, pp. 2342241, arXiv e-prints, arXiv:1505.04597v1, May 18, 2015, 8 pgs.
Ulyanov et al., "Instance Normalization: The Missing Ingredient for Fast Stylization", arXiv e-prints, arXiv:1607.08022, Nov. 6, 2017, pp. 1-6.
Miyato et al., "Spectral Normalization for Generative Adversarial Networks", ICLR, arXiv e-prints, arXiv:1802.05957v1, Feb. 16, 2018, 26 pgs.
Cohen et al., "Distribution Matching Losses Can Hallucinate Features in Medical Image Translation", International Conference on Medical Image Computing and Computer-Assisted Intervention, Springer, arXiv e-prints, arXiv: 1805.0884, May 22, 2018, pp. 1-11.
Vollmer et al., "Improved Laplacian Smoothing of Noisy Surface Meshes", Computer Graphics Forum, The Eurographics Association and Blackwell Publishers, vol. 18 , No. 3, 1999, 8 pgs.
Stolte et al., "Novel Techniques for Robust Voxelization and Visualization of Implicit Surfaces", Graphical Models, 2001, vol. 63, pp. 387-412.
Yang et al., "Automatic Liver Segmentation Using an Adversarial Image-to-Image Network", International Conference on Medical Image Computing and Computer-Assisted Intervention, Jul. 25, 2017, 8 pgs.
He et al., "Deep Residual Learning for Image Recognition", IEEE Conference on Computer Vision and Pattern Recognition (CVPR), 2015, pp. 770-778.
Ioffe et al., "Batch Normalization: Accelerating Deep Network Training by Reducing Internal Covariate Shift", arXiv e-prints, arXiv:1502.03167, Mar. 2, 2015, pp. 1-11.
Nair et al., "Rectified Linear Units Improve Restricted Boltzmann Machines", Proceedings of the 27th International Conference on Machine Learning (ICML-10), 2010, 8 pgs.
Loshchilov et al., "Decoupled Weight Decay Regularization", arXiv e-prints, arXiv: 1711.05101, Jan. 4, 2019, pp. 1-19.
Milletari et al., V-Net: Fully Convolutional Neural Networks for Volumetric Medical Image Segmentation, Fourth International Conference on 3D Vision (3DV), IEEE, 2016, 11 pgs.
Chaganti et al., "Quantification of Tomographic Patterns Associated with COVID-19 from Chest CT", arXiv e-prints, arXiv:2004.01279, Apr. 2020, 24 pgs.
Huang et al., "Densely Connected Convolutional Networks", Computer Vision Foundation, arXiv e-prints, arXiv:1608.06993v5, Jan. 28, 2018, 9 pgs.

Luo et al., "Adaptive Gradient Methods with Dynamic Bound of Learning Rate", arXiv e-prints, arXiv:1902.09843, Feb. 26, 2019, pp. 1-19.
National Lung Screening Trial Research Team, "The National Lung Screening Trial: Overview and Study Design", Radiology, vol. 258, No. 1, 2011, pp. 243-253.
Regan et al., "Genetic Epidemiology of COPD (COPDGene) Study Design", COPD: Journal of Chronic Obstructive Pulmonary Disease, vol. 7, No. 1, 2011, pp. 1-10.
Extended European Search Report (EESR) dated Aug. 13, 2021 in corresponding European patent application No. 21168065.7.
Liu, et al: "Decompose to manipulate: Manipulable Object Synthesis in 3D Medical Images with Structured Image Decomposition"; arxiv.org, Cornell University Library, 201 Olin Library Cornel University Ithaca, NY 14853; Dec. 4, 2018 (Dec. 4, 2018).
Dakai, Jin et al: "CT-Realistic Lung Nodule Stimulation from 3D Conditional Generative Adversarial Networks for Robust Lung Segmentation"; arxiv.org, Cornell University Library, 201 Olin Library Cornel University Ithaca, NY 14853; Jun. 11, 2018 /Jun. 11, 2018).
Wu, Eric et al: "Conditional Infilling GANs for Data Augmentation in Mammogram Classification"; Advences in Intelligent Data Analysis XIX, (Lecture Notes in Computer Science: Lect. Notes Computer); Springer International Publishing, Cham; pp. 98-106, Sep. 12, 2018 (Sep. 12, 2012).
Liu, et al: "3D Tomographic Pattern Synthesis for Enhancing the Quantification of COVID-19"; arxiv.org, Cornell University Ithaca, NY 14853; May 5, 2020 (May 5, 2020).
Hong, Xin et al: "Deep Fusion Network for Image Completion";Multimedia, ACM, 2 Penn Plaza, Suite 701, New York, NY 10121-0701 USA; Oct. 15, 2019 (Oct. 15, 2019), pp. 2033-2042.
U.S. Appl. No. 16/570,214, filed Sep. 13, 2019, 45 pgs.
U.S. Appl. No. 16/445,435, filed Jun. 19, 2019, 33 pgs.
Chaganti, Shikha et al. "Quantification of Tomographic Patterns Associated with COVID-19 from Chest CT", 2020, https://arxiv.org/ftp/arxiv/papers/2004/2004.01279.pdf.
Waskom, "Seaborn: statistical data visualization", Python 2.7 and 3.5.
Friedman, "Greedy Function Approximation: A Gradient Boosting Machine", The Annals of Statistics, 2001, vol. 29, No. 5, pp. 1189-1232.
Ghesu, Florian et al. "Multi-Scale Deep Reinforcement Learning for Real-Time 3D-Landmark Detection in CT Scans", IEEE, 2017, vol. 41, Nr. 1, pp. 1-14 (pp. 176-189).
Kim, "Outbreak of novel coronavirus (COVID-19): What is the role of radiologists?", European Radiology, 2020, 2 pgs.
Wilson et al., "Case-fatality risk estimates for COVID-19 calculated by using a lag time for fatality", Centers for Disease Control and Prevention,2020, vol. 26, No. 6, 104 pgs.
Xie et al., "Chest CT for typical 2019-ncov pneumonia: Relationship to negative RT-PCT testing", Radiology, 2020, 1-11 pgs.
Mei et al., "Artificial intelligence-enabled rapid diagnosis of COVID-19 patients", medRxiv preprint doi: https://doi.org/10.1101/2020.04.12.20062661, May 7, 2020, 30 pgs.
JHU, Coronavirus COVID-19 Global Cases by the Center for Systems Science and Engineering (CSSE) at Johns Hopkins University (JHU), https://gisanddata.maps. arcgis. com, Mar. 15, 2020.
Müllner, "Modern hierarchical, agglomerative clustering algorithms", arXiv Prepr arXiv11092378, Sep. 12, 2011, 29 pgs.
Li, Guangxu et al: "Statistical shape model building method using surface registration and model prototype."; Optics & Laser Technology 110 (2019); pp. 234-238; https://www.sciencedirect.com/science/article/pii/S0030399217311283 (Year: 2019).
Fang, Mengjie et al: "CT radiomics can help screen the coronavirus disease 2019 (COVID-19): a preliminary study"; Science China; Jul. 2020; vol. 63.
Bai et al., "Performance of radiologists in differentiating COVID-19 from viral pneumonia on chest CT", Radiology, 2020, 28 pgs.
Simpson et al., "Radiological Society of North America Expert Consensus Statement on Reporting Chest CT Findings Related to COVID-19, Endorsed by the Society of Thoracic Radiology, The

(56) References Cited

OTHER PUBLICATIONS

American College of Radiology, and RSNA", Radiol Cardiothorac Imaging ,2020, vol. 2, No. 2, 24 pgs.
Grillet et al., "Acute pulmonary embolism associated with COVID-19 pneumonia detected by pulmonary CT angiography", Radiology, 2020, 8 pgs.
Sozes, Ophier et al: "Rapid AI Development Cycle for the Coronavirus (COVID-19) Pandemic: Initial Results for Automated Detection & Patient Monitoring using Deep Learning CT Image Analysis"; (2020); arxiv.org; Cornell University Library; pp. 1-19; XP081619242 / Mar. 11, 2020.
Hosseiny et al., "Radiology perspective of coronavirus disease 2019 (COVID-19): Lessons from severe acute respiratory syndrome and middle east respiratory syndrome", American Journal of Roentgenology, 2020, 5 pgs.
Prokop et al., "CO-RADS—A categorical CT assessment scheme for patients with suspected COVID-19: definition and evaluation", Radiology, 2020, 37 pgs.
Tang, Zhenyu et al: "Severity Assessment of Coronavirus Disease 2019 (COVID-19) Using Quantitative Features from Chest CT Images"; (2020); arxiv.org; Cornell Univeristy Library; XP08162-8894 / Mar. 26, 2020.
Yang, Dong et al. "Automatic Liver Segmentation Using an Adversarial Image-to-Image Network", Medical Image Computing and Computer-Assisted Intervention, 2017, arXiv:1707.08037 [cs.CV], DOI: 10.1007/978-3-319-66179-7_58.
Bogdan, Georgescu et al: "Machine Learning Automatically Detects COVID-19 using Chest CTs in a large Multicenter Cohort"; Jun. 11, 2020; XP055858989.
Shan, Fei et al: "Lung Infection Quantification of COVID-19 in CT Images with Deep Learning"; arxiv; Cornell University Library; pp. 1-19; XP081618399/ Mar. 10, 2020.
Pan et al., "Time course of lung changes on chest CT during recovery from 2019 novel coronavirus (COVID-19) pneumonia", Radiology, 2020, 15 pgs.
Bai et al., "AI Augmentation of Radiologist Performance in Distinguishing COVID-19 from Pneumonia of Other Etiology on Chest CT", Radiology, 2020, 29 pgs.
Singh et al., "Classification of COVID-19 patients from chest CT images using multi-objective differential evolution-based convolutional neural networks", European Journal of ClinicalMicrobiology & Infectious Diseases; https://doi.org/10.1007/s10096-020-03901-z, Apr. 27, 2020, 11 pgs.
Carter et al., "ROC-ing along: Evaluation and interpretation of receiver operating characteristic curves", Surgery, 2016, vol. 159, No. 6, pp. 1-8.
Lang et al., "Hypoxaemia related to COVID-19: vascular and perfusion abnormalities on dual-energy CT", Lancet Infect Dis, Apr. 30, 2020, 3 pgs.
Shi, Feng et al: "Large-Scale Screening of CVID-19 from Community Acquired Pneumonia using Infection Size-Aware Classification"; (2020); arxiv.org; Cornell University Library; XP081885255; DOI: 10.1088/1361-6560/ABE838 / Mar. 22, 2020.
Feng, Pan et al: "Time Course of Lung Changes On Chest CT During Recovery From 2019 Novel Coronavirus (COVID-19) Pneumonia"; Radiology; vol. 295; No. 3; pp. 715-721.
Dilbag Singh, et al. ("Classification of COVID-19 patients from chest CT images using multi-objective differential evolution-based convolutional neural networks", Springer, Apr. 27, 2020, pp. 1-11). (Year: 2020).
Fang et al, ("CT radiomics can help screen the coronavirus disease 2019 (COVID-19): a preliminary study", Springer, vol. 63, No. 7, Apr. 15, 2020, pp. 1-8) (Year: 2020).

\* cited by examiner

400

900

| | Lung Training | Synthetic Data Input | Abnormality Pattern Training | Testing |
|---|---|---|---|---|
| # Data Sets | Total: 735, Pneumonia: 30, ILD: 205 | Control: 510 | Total: 698, COVID: 227, Pneumonia: 174, ILD: 297 | Total: 200, COVID-19: 100, Control: 100 |
| Data Origin | Multiple sites including sites in USA and Belarus | Multiple sites including sites in USA | Multiple sites including sites in USA, Canada, Spain, Swiss, France, Czech Republic, and Germany | Multiple sites including sites in USA, Spain and Czech Republic |
| Sex | Female: 136, Male: 208, Unknown: 391 | Female: 84, Male: 136, Unknown: 290 | Female: 211, Male: 232, Unknown: 257 | Female: 71, Male: 112, Unknown: 17 |
| Age (years) | Median: 64, IQR: 55.5-70, Unknown: 231 | Median: 60, IQR: 53.5-69, Unknown: 367 | Median: 60, IQR: 54-67, Unknown: 425 | Median: 61, IQR: 58-63.25, Unknown: 64 |
| Slice Thickness (mm) | ≤ 1.5: 384 ; (1.5,3.0]: 230 ; > 3.0: 121 | ≤ 1.5: 510, (1.5,3.0]: 0, > 3.0: 0 | ≤ 1.5: 381, (1.5,3.0]: 239 , > 3.0: 78 | ≤ 1.5: 56, (1.5,3.0]: 124, > 3.0: 20 |
| Reconstruction kernel | Soft: 136, Hard: 321, Unknown: 278 | Soft: 510, Hard: 0, Unknown: 0 | Soft: 94, Hard: 346, Unknown: 258 | Soft: 119, Hard: 81, Unknown: 0 |

| Method | | | DSC | Pearson's correlation on PO | Pearson's correlation on PHO |
| LungSeg | LesionSeg | 20% Syn | | | |
|---|---|---|---|---|---|
| Pneumonia Finetuned | 2D | ✗ | 0.6232 ± 0.1640 | 0.9078 (p-value = 1.2 × 10⁻⁷⁵) | 0.9063 (p-value = 5.4 × 10⁻⁷⁶) |
| Pneumonia Finetuned | 2D | ✓ | 0.6347 ± 0.1553 | 0.9334 (p-value = 4.2 × 10⁻⁹⁰) | 0.9235 (p-value = 2.5 × 10⁻⁸⁴) |
| Pneumonia Finetuned | 3D | ✗ | 0.6565 ± 0.1727 | 0.9331 (p-value = 6.9 × 10⁻⁹⁰) | 0.9099 (p-value = 1.3 × 10⁻⁷⁷) |
| Pneumonia Finetuned | 3D | ✓ | 0.6915 ± 0.1719 | 0.9591 (p-value = 1.6 × 10⁻¹¹⁰) | 0.9218 (p-value = 1.9 × 10⁻⁸³) |
| Pneumonia Finetuned+Syn | 2D | ✗ | 0.6348 ± 0.1538 | 0.9187 (p-value = 8.5 × 10⁻⁸²) | 0.9120 (p-value = 1.4 × 10⁻⁷⁸) |
| Pneumonia Finetuned+Syn | 2D | ✓ | 0.6450 ± 0.1511 | 0.9393 (p-value = 6.6 × 10⁻⁹⁴) | 0.9270 (p-value = 2.7 × 10⁻⁸⁶) |
| Pneumonia Finetuned+Syn | 3D | ✗ | 0.6768 ± 0.1646 | 0.9307 (p-value = 2.1 × 10⁻⁸⁸) | 0.9317 (p-value = 4.9 × 10⁻⁸⁹) |
| Pneumonia Finetuned+Syn | 3D | ✓ | 0.7064 ± 0.1586 | 0.9613 (p-value = 8.7 × 10⁻¹¹³) | 0.9387 (p-value = 1.7 × 10⁻⁹³) |

| DSC | PCC on PO | PCC on PHO |
|---|---|---|
| $0.7132 \pm 0.1831$ | 0.9547 (p-value = $4.0 \times 10^{-7}$) | 0.9702 (p-value = $4.0 \times 10^{-8}$) |

Figure 14

MEDICAL IMAGE SYNTHESIS OF ABNORMALITY PATTERNS ASSOCIATED WITH COVID-19

CROSS-REFERENCE TO RELATED APPLICATIONS

This application claims the benefit of U.S. Provisional Application No. 63/010,198, filed Apr. 15, 2020, the disclosure of which is incorporated herein by reference in its entirety.

TECHNICAL FIELD

The present invention relates generally to medical image synthesis, and in particular to medical image synthesis of abnormality patterns associated with COVID-19 (coronavirus disease 2019) for training machine learning based systems.

BACKGROUND

COVID-19 (coronavirus disease 2019) is an infectious disease caused by SARS-Cov2 (severe-acute respiratory symptom coronavirus 2). Common symptoms of COVID-19 include fever, cough, and difficulty breathing. In severe cases, COVID-19 can cause pneumonia, severe acute respiratory syndrome, and multiple organ failure. In the majority of cases, patients infected with COVID-19 experience mild to moderate symptoms that do not require hospitalization, and many patients are asymptomatic. However, COVID-19 is fatal to a significant percentage of infected patients. Due to the high R0 (reproduction number) and the infectious nature of COVID-19, tools for rapid testing and evaluation are important to track and mitigate its spread.

In the current clinical practice, COVID-19 is diagnosed via RT-PCR (reverse transcription polymerase chain reaction). However, the sensitivity of RT-PCR has been found to be as low as 60 to 70%, potentially resulting in false negatives. Additionally, limited availability of RT-PCR test kits has contributed to the undetected spread of COVID-19.

Recent studies have shown that abnormality patterns, such as, e.g., ground glass opacities, crazy paving patterns, and consolidations, seen in lung CT (computed tomography) images correlate to the severity and progression of COVID-19. Machine learning based systems for automatically assessing COVID-19 based on such features would be useful. However, due to the novelty of COVID-19, the availability of appropriate imaging data and annotations for training such machine learning based systems is limited.

BRIEF SUMMARY OF THE INVENTION

In accordance with one or more embodiments, systems and methods for generating a synthesized medical image are provided. An input medical image is received. A synthesized segmentation mask is generated. The input medical image is masked based on the synthesized segmentation mask. The masked input medical image has an unmasked portion and a masked portion. An initial synthesized medical image is generated using a trained machine learning based generator network. The initial synthesized medical image includes a synthesized version of the unmasked portion of the masked input medical image and synthesized patterns in the masked portion of the masked input medical image. The synthesized patterns is fused with the input medical image to generate a final synthesized medical image.

In one embodiment, the synthesized patterns are synthesized abnormality patterns associated with a disease. In one embodiment, the disease is COVID-19 (coronavirus disease 2019) and the synthesized abnormality patterns comprise one or more of ground glass opacities (GGO), consolidation, and crazy-paving pattern. In one embodiment, the disease is at least one of a viral pneumonia, a bacterial pneumonia, a fungal pneumonia, and a mycoplasma pneumonia.

In one embodiment, the synthesized segmentation mask is generated by generating individual masks each corresponding to a connected component region and combining the individual masks. Each individual mask is generated by selecting a number of points on a surface of a mesh of a sphere and applying a transformation to each particular point. The transformation applied to the particular point is propagated to neighboring vertices on the surface of the mesh based on a distance between the particular point and each of the neighboring vertices as compared to a distance threshold. Each individual mask is positioned by sampling locations from a spatial probability map and positioning the individual masks based on the sampled locations.

In one embodiment, the synthesized patterns are fused with the input medical image by blending the initial synthesized medical image with the input medical image to generate a blended image, smoothing boundaries of the synthesized segmentation mask to generate a smooth synthesized segmentation mask, cropping masked portions of the smooth synthesized segmentation mask from the blended image to extract the synthesized patterns, cropping unmasked portions of the smooth synthesized segmentation mask from the input medical image to extract remaining regions of the input medical image, and combining the extracted synthesized patterns and the extracted remaining regions.

In one embodiment, a machine learning based system is trained for performing a medical image analysis task based on the final synthesized medical image. The medical image analysis task may be at least one of assessment of a disease, segmentation of an anatomical structure, and segmentation of the patterns.

These and other advantages of the invention will be apparent to those of ordinary skill in the art by reference to the following detailed description and the accompanying drawings.

BRIEF DESCRIPTION OF THE DRAWINGS

FIG. 9 shows a table summarizing a dataset for training and evaluating a lung segmentation network and an abnormality pattern segmentation network

FIG. 13 shows a table summarizing metrics evaluating various lung segmentation strategies;

FIG. 14 shows a table showing the variability between readers annotating disease severity;

DETAILED DESCRIPTION

Figure 1:
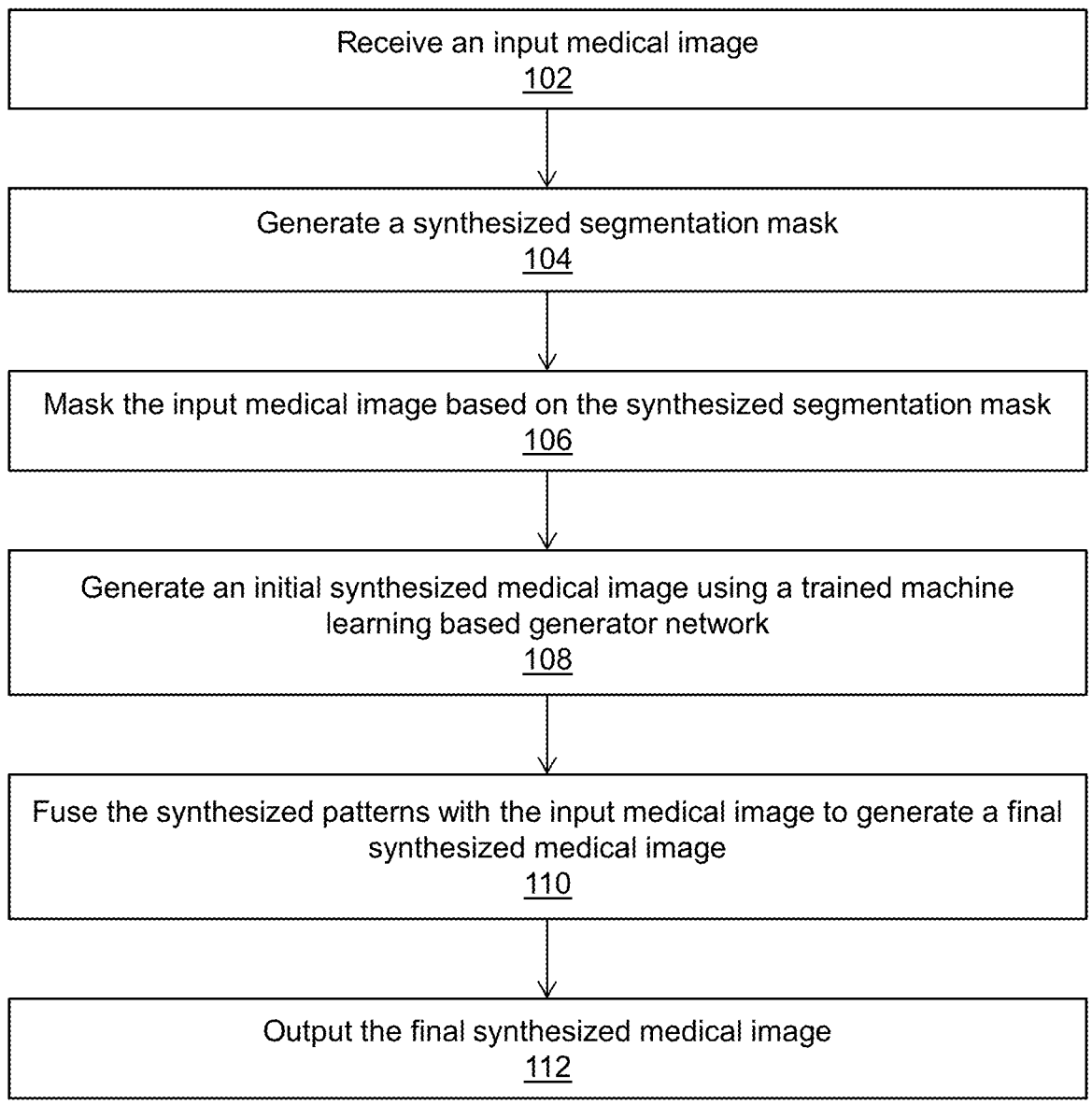
FIG. 1 shows a method for generating synthesized medical images, in accordance with one or more embodiments.

Embodiments described herein generally relate to methods and systems for medical image synthesis of abnormality patterns associated with COVID-19 (coronavirus disease 2019). Embodiments of the present invention are described herein to give a visual understanding of such methods and systems. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

COVID-19 is an infectious disease that typically presents such respiratory symptoms as fever, cough, and difficulty breathing. CT (computed tomography) imaging of the lungs of patients that have COVID-19 show abnormal radiographic patterns. The extent of such abnormality patterns correlate to the severity of COVID-19. Machine learning based systems may be utilized to assess such abnormality patterns to thereby evaluate patients for COVID-19. However, the availability of annotated imaging data suitable for training such machine learning based systems is limited.

Embodiments described herein provide for generating synthesized medical images depicting abnormality patterns associated with COVID-19. Such abnormality patterns associated with COVID-19 are inpainted on medical images of lungs of patients without COVID-19 using a machine learning based generator network. An appropriate distribution of such abnormality patterns on the lungs is obtained based on the location of the abnormality patterns on manually labelled images of lungs of patients with COVID-19. Advantageously, embodiments described herein provide for realistic synthesized medical images of abnormality patterns associated with COVID-19. Such synthesized medical images may be utilized for training machine learning based systems for, e.g., assessment of a disease (e.g., COVID-19), segmentation of an anatomical structure (e.g., lungs), segmentation of abnormality patterns associated with a disease (e.g., COVID-19), or other medical image analysis tasks.

It should be understood that while embodiments described herein are described with respect to generating synthesized medical images of abnormality patterns associated with COVID-19, such embodiments are not so limited. Embodiments may be applied for the synthesis of medical images depicting abnormality patterns associated with any disease, such as, e.g., other types of viral pneumonia (e.g., SARS (severe acute respiratory syndrome), MERS (Middle East respiratory syndrome), etc.), bacterial pneumonia, fungal pneumonia, mycoplasma pneumonia, and other types of pneumonia and other types of diseases. Further, embodiments may be applied for the synthesis of medical images depicting a pattern of any object of interest, such as, e.g., organs, vessels, or other anatomical structures.

Figure 2:
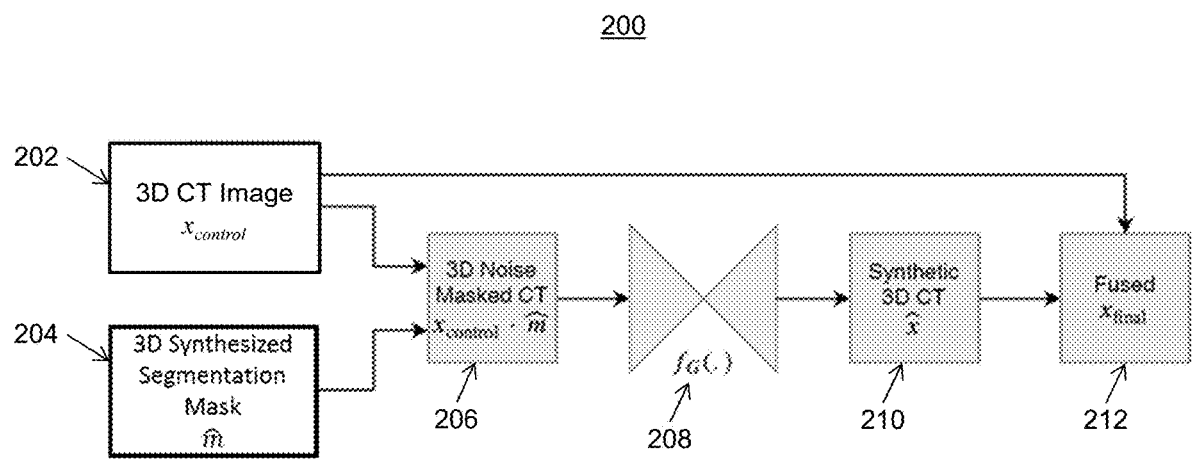
FIG. 2 shows a framework for generating synthesized medical images, in accordance with one or more embodiments.

FIG. 1 shows a method 100 for generating synthesized medical images, in accordance with one or more embodiments. The steps of method 100 may be performed by one or more suitable computing devices, such as, e.g., computer 1702 of FIG. 17. FIG. 2 shows a framework 200 for generating synthesized medical images, in accordance with one or more embodiments. FIG. 1 and FIG. 2 will be described together.

At step 102, an input medical image is received. In one embodiment, the input medical image depicts the lungs of a patient that does not have a pulmonary disease (e.g., COVID-19) and therefore the input medical image does not include abnormality patterns associated with a pulmonary disease. In one embodiment, the input medical image is a CT input medical image. However, the input medical image may be of any suitable modality, such as, e.g., MRI (magnetic resonance imaging), ultrasound, x-ray, or any other modality or combination of modalities. The input medical image may be a 2D image or 3D volume. The input medical image may be received directly from an image acquisition device, such as, e.g., a CT scanner, as the input medical image is acquired, or can be received by loading a previously acquired input medical image from a storage or memory of a computer system or receiving the input medical image from a remote computer system.

In one example, the input medical image is 3D CT image 202, denoted $x_{control}$, in framework 200 of FIG. 2. 3D CT image 202 may have been resampled to a resolution of 0.75×0.75×1 mm, the image intensities normalized to a range of [−1,1] using a standard lung window with level −600 and window width 1500, and cropped to a size of 384×384×18 pixels.

At step 104, a synthesized segmentation mask is generated. For example, the synthesized segmentation mask may be 3D synthesized segmentation mask 204, denoted $\hat{m}$, in framework 200 of FIG. 2. The synthesized segmentation mask may be of any object of interest (e.g., anatomical structures such as organs or vessels). In one embodiment, the synthesized segmentation mask is of abnormality patterns associated with a disease. For example, the disease may be COVID-19 and the abnormality patterns may include opacities such as, e.g., GGO (ground glass opacity), consolidation, crazy-paving pattern, atelectasis, interlobular septal thickening, pleural effusions, bronchiectasis, etc. However, the disease may include any disease, such as, e.g., other types of viral pneumonia (e.g., SARS (severe acute respiratory syndrome), MERS (Middle East respiratory syndrome), etc.), bacterial pneumonia, fungal pneumonia, mycoplasma pneumonia, and other types of pneumonia and other types of diseases.

In one embodiment, the synthesized segmentation mask is generated using 3D meshes, thereby giving full control of the geometry of the abnormality patterns and ensuring a closed shape. The synthesized segmentation mask is generated by first generating one or more individual masks each corresponding to a connected component region of the abnormality pattern. Each individual mask is generated by selecting (e.g., randomly) N points on the surface of a template mesh of a sphere, where N is any positive integer. For each point N, an affine transformation function $\alpha_j$ of a random amplitude factor $\lambda$ is applied. The transformation of each point is propagated to neighboring vertices of the mesh based on a distance between the point N and the neighboring vertices as compared to a distance threshold of $\delta$. Thus, for each sampled vertex $v_i$ (corresponding to a point N) and each neighbor vertex $n_j$, the affine transformation function $\alpha_j$ is defined as:

$$\alpha_j = 1 + ((\delta - |v_i - n_j|) * \lambda) \quad \text{(Equation 1)}$$

In addition, a Laplacian smoothing is applied, followed by a Humphrey filtering. The resulting mesh is rasterized to generate a 3D mask using recursive subdivision.

Figure 3:
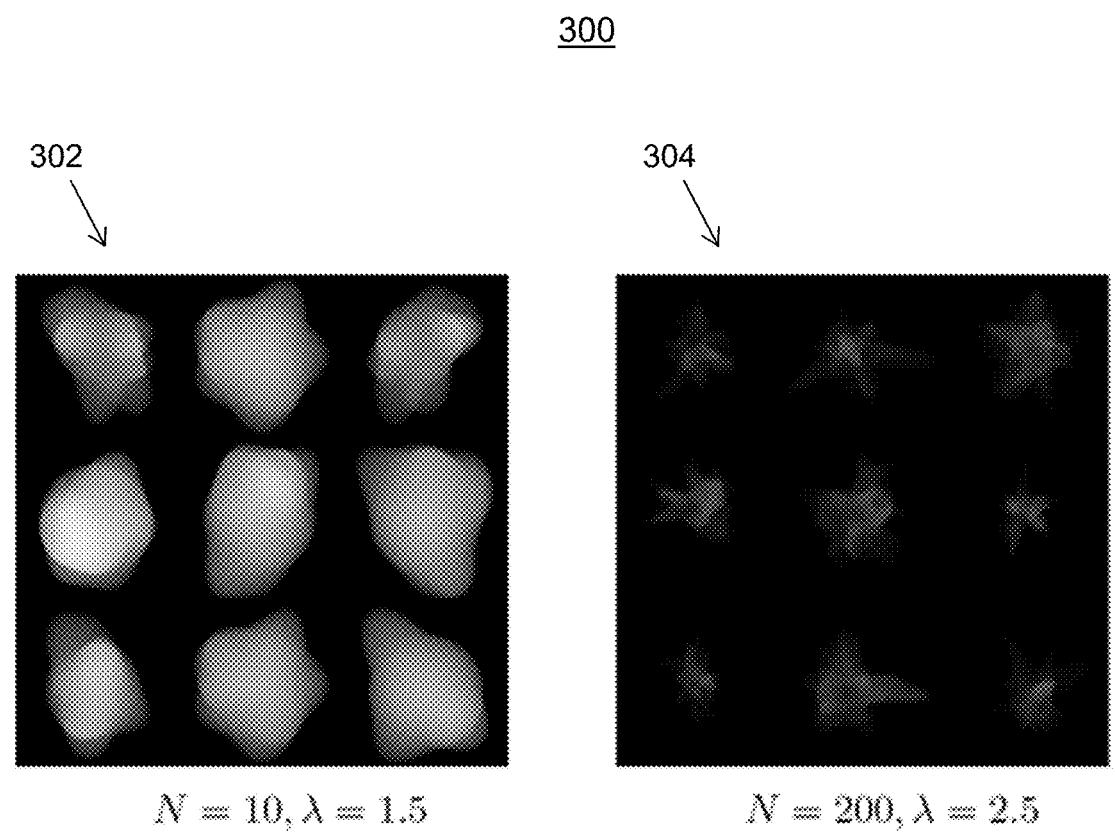
FIG. 3 shows exemplary images of individual masks corresponding to connected component regions of an abnormality pattern associated with COVID-19 (coronavirus disease 2019), in accordance with one or more embodiments.

FIG. 3 shows exemplary images 300 of individual masks corresponding to connected component regions of an abnormality pattern associated with COVID-19, in accordance with one or more embodiments. The individual masks in image 302 are generated using N=10 points and an amplitude factor $\lambda$=1.5, while the individual masks in image 304 are generated using N=200 points and an amplitude factor $\lambda$=2.5.

Figure 4:
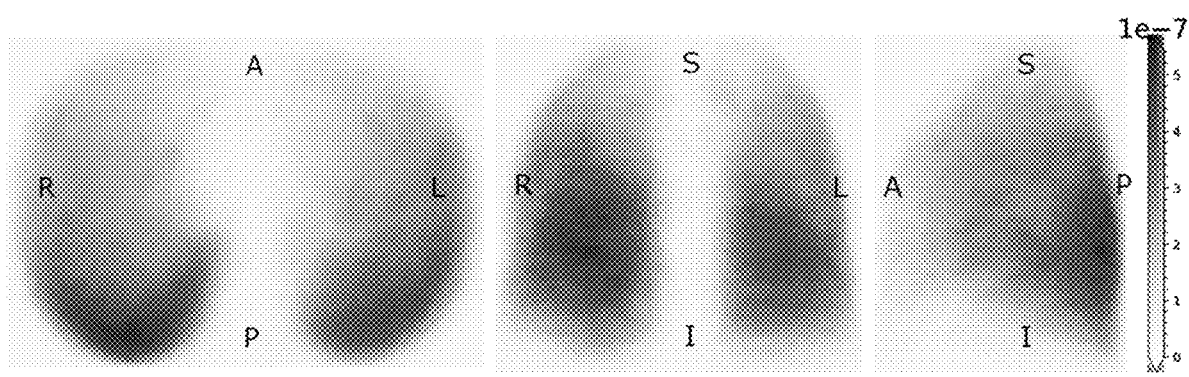
FIG. 4 shows an exemplary spatial probability map, in accordance with one or more embodiments.

Many diseases, such as, e.g., COVID-19, typically present with abnormality patterns in subpleural, peripheral, bilateral, and multilobar locations. Accordingly, in one embodiment, to simulate the spatial distribution of such abnormality patterns, a spatial probability map of the abnormality patterns is computed using aligned, manually annotated images of abnormality patterns of the disease. Lesion center locations are sampled from the spatial probability map and the sampled locations are mapped to the corresponding image space of the synthesized segmentation mask. The individual masks are positioned at each mapped location to provide a realistic spatial distribution of the abnormality patterns. FIG. 4 shows an exemplary spatial probability map 400, in accordance with one or more embodiments. Probability map 400 is shown with respect to left (L), right (R), anterior (A), posterior (P), superior (S), and interior (I) directions. Darker shading in probability map 400 corresponds to a higher probability.

The individual masks are then combined to generate the synthesized segmentation mask. In one embodiment, the individual masks are combined by taking the union of the individual masks. The combined individual mask is then cropped using a computed lung mask to generate the synthesized segmentation mask.

At step 106, the input medical image is masked based on the synthesized segmentation mask. The masked input medical image includes one or more unmasked portions and one or more masked portions, as defined by the synthesized segmentation mask. The masked portions are filled with uniform noise with values between, e.g., [−1,1]. In one example, the masked input medical image is 3D noise masked CT image 206, denoted as $x_{control} \cdot \hat{m}$, where $\cdot$ denotes the operation filling uniform noise in the masked portions.

At step 108, an initial synthesized medical image is generated using a trained machine learning based generator network. In one example, the initial synthesized medical image is synthetic 3D CT image 210, denoted $\hat{x}$, generated using generator network $f_g(\cdot)$ 208 in FIG. 2. In one embodiment, the generator network is a GAN (generative adversarial network), however any other suitable machine learning based network may additionally or alternatively be employed. The generator network is trained during a prior offline or training stage and applied at step 108 during an online or inference stage. The training and architecture of the generator network is described in detail below with respect to FIG. 8.

The initial synthesized medical image includes a synthesized version of the unmasked portions of the masked input medical image and synthesized patterns (e.g., abnormality mappers associated with the disease) in the masked portions of the masked input medical image. The synthesized version of the unmasked portions of the masked input medical image may be synthesized by regenerating the unmasked portions or by copying imaging data of the unmasked portions from the masked input medical image.

The generator network generates initial synthesized medical images using a sliding window approach moving along the z dimension only. The window size is fixed at the size of the masked input medical image (e.g., 384×384×18 pixels). In operation, the generator network receives one or more masked input medical images as input for generating initial synthesized medical images at respective iterations. Between masked input medical images input into the generator network, there is an overlap of 9 pixels. The overlapped region of a masked input medical image input into the generator network is filled with the initial synthesized medical image output by the generator network during its prior iteration to thereby avoid discontinuity artefacts. Thus, except during the first iteration, the machine learning based network generates initial synthesized medical images conditioned on the initial synthesized medical image generator at its previous iteration.

Figure 5:
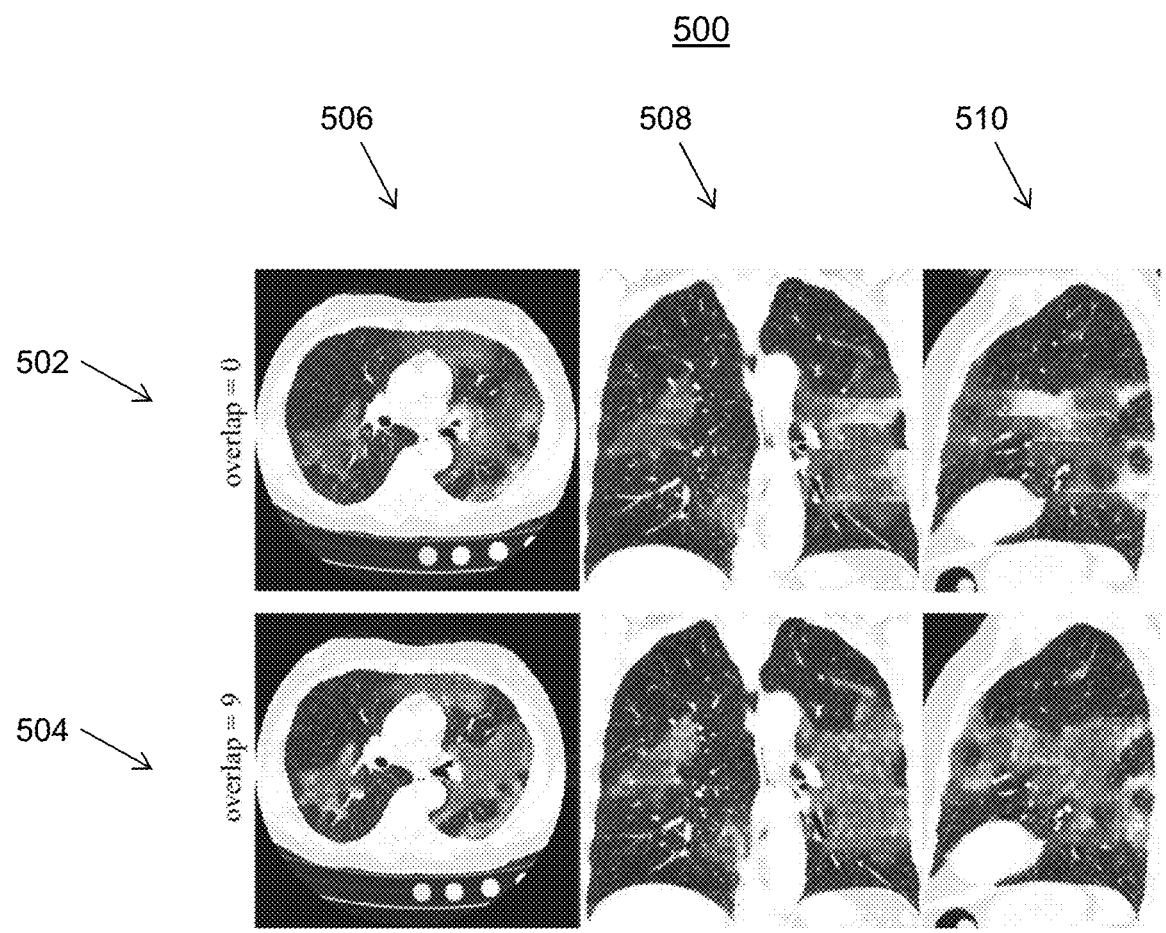
FIG. 5 shows exemplary initial synthesized medical images generated by a generator network with various amounts of overlap, in accordance with one or more embodiments.

FIG. 5 shows exemplary initial synthesized medical images 500 generated by a generator network with various amounts of overlap, in accordance with one or more embodiments. Images in row 502 are generated with an overlap of zero pixels (i.e., no overlap) while images in row 504 are generated with an overlap of 9 pixels. Images in column 506 show an axial view, images in column 508 show a coronal view, and images in column 510 show a sagittal view. As seen in FIG. 5, images generated with an overlap of 9 pixels in column 504 have a better consistency along the z dimension.

At step 110, the synthesized patterns are fused with the input medical image to generate a final synthesized medical image. In one example, the final synthesized medical image is fused image 212, denoted $x_{final}$, in framework 200 of FIG. 2. The synthesized patterns are fused with the input medical image to 1) avoid any intensity bias, 2) to avoid any other patterns hallucinated by the trained machine learning based network, and 3) to show underlying vessels and bronchi that are visible through ground glass opacities and other patterns that are transparent or semi-transparent.

To fuse the synthesized patterns with the input medical image, first the initial synthesized medical image $\hat{x}$ is blended with the input medical image $x_{control}$ with a weighted sum:

$$x_{blend} = \beta \alpha \hat{x} + (1-\beta) x_{control} \quad \text{(Equation 2)}$$

where β is the constant weight for the initial synthesized medical image and α is a parameter to adjust the intensity of the synthesized abnormality patterns for areas above −200 HU (Hounsfield units). The boundaries of the synthesized segmentation mask are smoothed using a linear distance transform to generate smooth synthesized segmentation mask $\hat{m}_{smooth}$. The final synthesized medical image $x_{final}$ is generated by cropping the blended image $x_{wend}$ and the input medical image $x_{control}$ using the smooth synthesized segmentation mask $\hat{m}_{smooth}$. In particular, masked portions of the smooth synthesized segmentation mask $\hat{m}_{smooth}$ are cropped from the blended image $x_{blend}$ to extract the synthesized patterns and the unmasked portions of the smooth synthesized segmentation mask $\hat{m}_{smooth}$ are cropped from the input medical image $x_{control}$ to extract remaining regions of the input medical image $x_{control}$. The final synthesized medical image $x_{final}$ is generated by combining the extracted synthesized patterns with the extracted remaining regions of the input medical image as follows:

$$x_{final} = (x_{control} \circ \neg \hat{m}_{smooth}) + (x_{blend} \circ \hat{m}_{smooth}). \quad \text{(Equation 3)}$$

At step 112, the final synthesized medical image is output. For example, the final synthesized medical image can be output by displaying the final synthesized medical image on a display device of a computer system, storing the final synthesized medical image on a memory or storage of a computer system, or by transmitting the final synthesized medical image to a remote computer system.

In one embodiment, the final synthesized medical image may be used for training a machine learning based systems for performing a medical image analysis task, such as, e.g., assessment of disease (e.g. COVID-19), segmentation of an anatomical structure (e.g., lungs), segmentation of abnormality patterns associated with a disease (e.g., COVID-19), or any other medical image analysis task.

Figure 6:
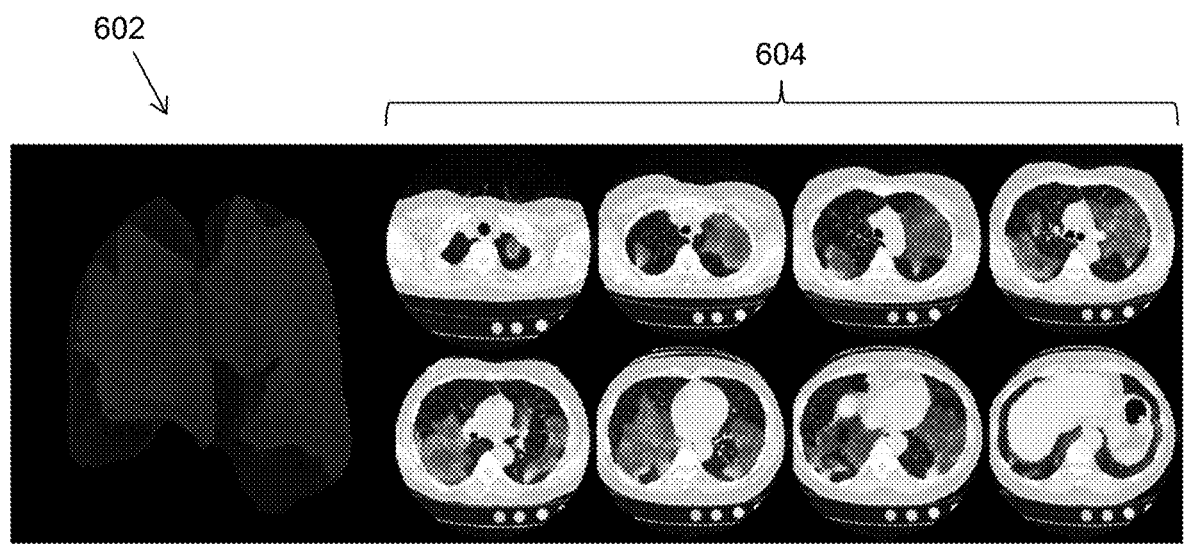
FIG. 6 shows an image of a synthesized segmentation mask and images of axial slices of a final synthesized medical image generated using the synthesized segmentation mask, in accordance with one or more embodiments.

FIG. 6 shows an image 602 of a synthesized segmentation mask with an automatically computed lung segmentation and images 604 of axial slices of the final synthesized medical image generated using the synthesized segmentation mask.

Figure 7:
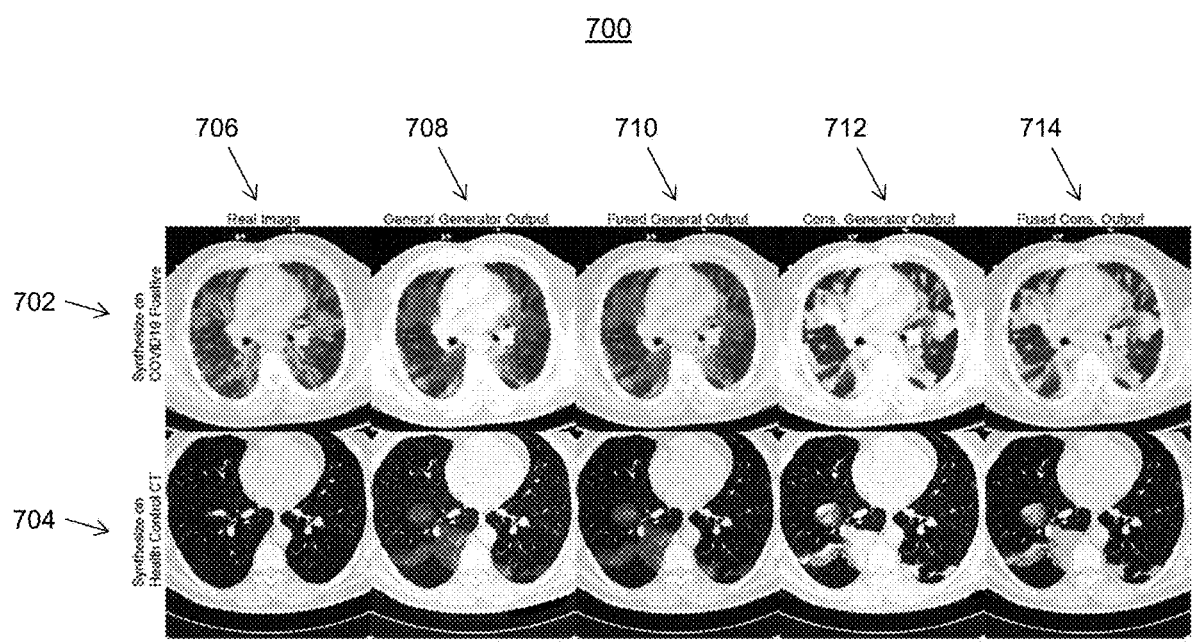
FIG. 7 shows a comparison of real images with images generated according to one or more embodiments described herein.

FIG. 7 shows a comparison 700 of real images with images generated according to one or more embodiments described herein. Column 706 shows real CT images. Column 708 shows initial synthesized medical images generated using a generator network trained using only COVID-19 positive images. Column 710 shows final synthesized medical images generated by fusing abnormality regions in the images of column 708 with the input medical image. Column 712 shows initial synthesized medical images generated using a generator network trained using only high intensity abnormality patterns. Column 714 shows final synthesized medical images generated by fusing abnormality regions in the images of column 712 with the input medical image. The synthesized images (in columns 708-714) in row 702 were generated by inpainting synthesized abnormality patterns on to lungs of a patient with COVID-19 using a manually annotated mask. The synthesized images (in columns 708-714) in row 704 were generated by inpainting synthesized abnormality patterns on to lungs of a patient without COVID-19 using a synthesized segmentation mask.

Figure 8:
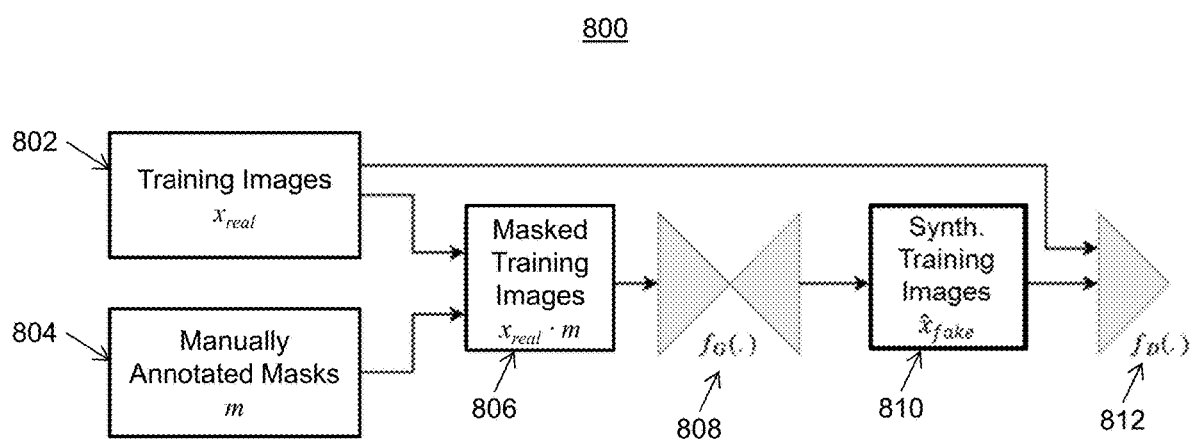
FIG. 8 shows a framework for training a machine learning based generator network for generating synthesized medical images, in accordance with one or more embodiments.

FIG. 8 shows a framework 800 for training a machine learning based generator network for generating synthesized medical images, in accordance with one or more embodiments. Framework 800 may be performed during an offline or training stage for training the generator network for generating synthesized medical images. Once trained, the trained generator network is applied during an online or inference stage. In one example, the trained generator network is applied at step 108 of FIG. 1 to generate an initial synthesized medical image. In another example, the trained generator network is generator network 208 of FIG. 2.

In framework 800, one or more training images $x_{real}$ 802 showing patterns (e.g., abnormality patterns associated with a disease) and manually annotated masks m 804 of the patterns in training images 802 are received. In one embodiment, training images 802 are real CT training image of lungs of a patient with abnormality patterns associated with a disease. However, training images 802 may be of any suitable modality. Training images 802 are resampled to a resolution of 0.75×0.75×1 mm and image intensities normalized to a range of [−1,1] using a standard lung window with level −600 and window width 1500. Training images 802 are cropped to a size of, e.g., 384×384×18 pixels and centered around both lungs. Training images 802 are masked with manually annotated masks 804, resulting in masked training images 806, denoted $x_{real}$·m. The masked portions of masked training images 806 are filled with uniform noise with values between a range of [−1,1] such that the patterns in training images 802 are hidden.

Given masked training images 806, generator network $f_G(\cdot)$ 808 is trained to obtain the mapping $x_{real} = f(x_{real} \cdot m)$ to generate synthesized training images $\hat{x}_{fake}$ 810 depicting the patterns. Generator network 808 is trained using positive cases of the disease only. In one embodiment, generator network 808 is a GAN implemented with a 3D UNet, but may be any suitable machine learning based generator network. For each building block of generator network 808, an instance normalization is used, followed by a 3×3×3 convolution layer and LeaklyReLU (Leakly rectified linear unit). Synthesized training images 810 are generated to be the same size as the input training images 802 and is activated with the Tanh function. Training images 802 and synthesized training images 810 are input into a discriminator network $f_D(\cdot)$ 812, which classifies one image as real and the other as synthesized (i.e., fake). Discriminator network 812 is built with a simple multilayer CNN (convolutional neural network). Spectral Normalization is used in discriminator network 812 to balance the learning speed of both discriminator network 812 and generator network 808. For both training images 802 and synthesized training images 810 input into discriminator network 812, a 3D tensor n~$\mathcal{N}$(0,0.2) drawn from the Gaussian noise is added to avoid the discriminator network 812 from pre-maturing during the early iterations. The noise biased input are clipped back to a range of [−1,1] before being fed into discriminator network 812.

The objectives for training generator network 808 are as follows:

$$\hat{x}_{fake} = f_G(x_{real} \cdot m) \quad \text{(Equation 4)}$$

$$L_D = \|f_D(n + x_{real}) - t(1)\|_2^2 + \|f_D(n + \hat{x}_{fake}) - t(0)\|_2^2 \quad \text{(Equation 5)}$$

$$L_G = \lambda_1 |x_{fake} \circ \neg m - \hat{x}_{fake} \circ \neg m| + \lambda_2 |x_{fake} \circ m - \hat{x}_{fake} \circ m| - L_D \quad \text{(Equation 6)}$$

where $x_{real}$ is the real training image 802, m is the manually annotated mask 804 of the patterns, · denotes the operation of filling uniform noise into the masked regions, t(·) is a target tensor filling with a constant value (0 or 1) with the same size as the discriminator output, ∘ denotes tensor element-wise multiplication, ¬m is the reversed mask that covers the non-impacted areas (the regions without the patterns), $\lambda_1$ and $\lambda_2$ are hyperparameters to balance the L1 losses in the portions with the abnormality patterns as well as the weight of the discriminator loss. The LSGAN (least squares generative adversarial network) objective is used, which measures the L2 errors between the discriminator output and the target. During experimentation, $\lambda_1$ and $\lambda_2$ were fixed at $\lambda_1=\lambda_2=10$. Adam was used to optimize the generator network 808 and the discriminator network 812 with a learning rate of 0.001 for the generator network 808 and 0.004 for the discriminator network 812. A general pattern generator and a consolidation biased generator were trained. The general pattern generator was trained with all of the annotated patterns. The consolidation biased generator was fine-tuned based on the general pattern generator with training images having above −200 mean intensity in the annotated regions.

Embodiments described herein were experimentally validated by generating synthesized medical images of abnormality patterns associated with COVID-19 for training machine learning based systems for segmentation of lungs of a patient and for segmenting abnormality patterns.

Segmentation of lungs of a patient with COVID-19 was performed by training a deep image to image network (DI2IN). Training datasets of 675 images for training and 60 images for validation were utilized. The images depicted moderate pneumonia patterns that were annotated. However, the images depicting pneumonia are not sufficient for training the DI2IN for segmentation of lungs of a patient with COVID-19 due to the heavy consolidation abnormality patterns that is typical in lungs of a patient with COVID-19. Therefore, 1530 synthesized medical images of abnormality patterns associated with COVID-19 were generated according to embodiments described herein and included in the datasets to augment the images of pneumonia. To account for the inclusion of synthesized medical images, a number of adjustments were made to the training process. First, a weighted cross entropy was used to focus on high intensity areas. Given 1) an input image x normalized from a CT image by the center of −624 HU and the width of 1500 HU and clipped to the range of [−4,1], and 2) a predicted output p of a segmentation network $f_s(x)$, i.e., $p=f_s(x)$, a voxel-wise weighted binary cross entropy was used as follows that assigns additional attention on high intensity areas inside the lung.

$$L_s = -w[y\log(p) + (1-y)\log(1-p)] \quad \text{(Equation 7)}$$

$$w = 1 + \gamma_1 \frac{y}{1+\exp(-\gamma_2 x)} \quad \text{(Equation 8)}$$

where $\gamma_1$ and $\gamma_2$ respectively represent the magnitude and the steepness of high intensity adjustment. Second, the last skip connection (at the input size level) was removed from the DI2IN to constrain the lung shape despite the presence of severe consolidation abnormality patterns. The training process received as input 128×128×128 image patches randomly sampled from 2×2×2 mm³ resampled volumes, and is driven by a learning rate of 0.001 using Adam optimization. The model for the epoch with the best performance on the validation set was selected.

Segmentation of abnormality patterns associated with COVID-19 was performed by training an encoder-decoder based CNN architecture. To learn the relevant abnormality patterns, the encoder-decoder was trained on a training dataset of patients with COVID-19, viral pneumonia, and other interstitial lung diseases. To analyze the impact of synthesized COVID-19 data for training, synthesized medical images of abnormality patterns associated with COVID-19 were generated according to embodiments described herein and included in the training dataset. A 2D CNN approach and a 3D CNN approach were both utilized. The 2D CNN approach aimed to learn high-resolution in-plane image features by taking three axial slices as input to the network. The 3D CNN approach was utilized to efficiently model 3D context with anisotropic image resolution.

The 2D CNN approach was based on a U-Net architecture with an encoder to model relevant image features of COVID-19 and a decoder to generate the segmentation mask. A ResNet-32 architecture was employed in which the feature encoder used 5 ResNet blocks comprising two 3×3 convolutions with batch normalization and ReLU, followed by additive identity skip connection. The decoder had the same number of convolution blocks as in the encoder. The input to each decoding block was concatenated with the encoding features with the same resolution. The training images were resampled to have an in-plane resolution of 0.6×0.6 mm. Then, the geometric center was computed and the images were cropped with a fixed bounding box of size 512×512. The original out-plane resolution and dimension were retained. The images were clipped by the lung window with a width of 1174 HU and level −150 HU, and then normalized to [−1,1]. The network was trained with Adam optimization with decoupled weight decay regularization. A soft dice loss was applied to the decoder output prediction to penalize the difference from ground-truth COVID-19 annotations during training. For data augmentation, a random mirror flip was applied for in-plane orientations with a probability of 0.5 and in-plane random translations that were limited to 10 voxels in each dimension. The image intensity was perturbed within a random interval of [−10,10] HU.

The 3D CNN approach was also based on the 3D U-Net architecture with dense-convolutional blocks and anisotropic feature computation for higher resolution features and isotropic for lower resolution. Input CT volumes were pre-processed by resampling them to 1×1×3 mm resolution and cropped based on the lung segmentation to a fixed 384×384×128 box. Input data was masked by the lung segmentation and normalized using a standard lung window with width 1500 HU and level −600 HU and clipped to a range of [0,1]. During training, additional data augmentation was performed by random intensity perturbation within a range of [−20,20] HU and random flipping along x or y directions. The 3D neural network used convolution blocks comprising either 1×3×3 or 3×3×3 CNN kernels in dense blocks of convolution-BatchNormalization-LeakyReLU layers. For downsampling, the encoder features are computed using a 1×2×2 or 2×2×2 convolution layers with a 1×2×2 or 2×2×2 stride. For upsampling, transpose-convolution layers were used with the same kernel sizes. The top two decoder-encoder network levels used anisotropic features followed by three isotropic levels. The input to each decoder block was obtained by concatenating the corresponding encoder output features with the same resolution as the output of the previous upsampling block. The final output used a softmax activation layer. The 3D network was trained using the AdaBound optimizer, which adaptively combines the Adam optimizer with SGD (stochastic gradient descent) for faster convergence. The Jaccard index was used as the training loss function, which was found have stable behavior for imbalanced labels.

Advantages of the 3D CNN approach include the ability to use 3D context to deal with in-plane partial volume effects as well as global lung context. Disadvantages of the 3D CNN approach include higher computational complexity and potentially higher complexity and overfitting in training due to a lower number of total samples. The choice of using anisotropic features is made as a compromise between computational complexity and having reasonable high-resolution features computed in the axial acquisition planes.

FIG. 9 shows a table 900 summarizing a dataset used for training and evaluating the lung segmentation network and the abnormality pattern segmentation network. The lung segmentation and abnormality pattern segmentation networks were trained on dedicated datasets to address the challenges specific to each task. The performance of the systems were evaluated using the same testing set.

The testing set comprised 100 control images and 100 COVID-19 positive images. The control group was randomly sampled from published dataset. Candidates were identified from the clinical reports and visually confirmed by a trained user after selection. The 100 COVID-19 positive patients were sampled from data sources with a clinical confirmation. 110 candidate scans were randomly selected from 2 European and 2 American institutions. Ten datasets with the lowest percent of opacity (PO) measured using the ground truth annotations were excluded. All volumes referenced to the patients selected in the testing set were excluded from any training sets. The lesion segmentation training set included the remaining 227 COVID-19 positive cases collected from 10 clinical collaborators, augmented with 174 3D chest CTs with pneumonia patterns and 297 cases with interstitial lung diseases. The lung segmentation training set comprised 735 CT scans with both pathological (including pneumonia, interstitial lung disease) and control volumes. 187 datasets were common to the lesion segmentation training set and the lung segmentation training. The synthetic images used in this experiment were generated based on 510 control images acquired from a published dataset. 3 images were synthesized based on each real control image, resulting in 1530 synthetic images in total.

The original data formats were either DICOM (digital imaging and communications in medicine) images or 3D meta-images. The 3D CT series as reconstructed from DICOM images by keeping the original resolution and reorienting the volume axially. The annotation of the data has been formalized as two independent tasks: the annotation of the lungs and the annotation of lesions (abnormality patterns associated with, e.g., COVID-19, pneumonia, and interstitial lung disease).

For lung segmentation training, the ground truth for each training dataset was generated by expert users with a custom annotation tool. The user loaded anonymized 3D CT series (volumes), interacted with the image (including 3 multi-planar reformatted images), and drew and edited contours and mark regions with a pre-specified label for the lungs. The final mask was saved as a file together with the reference to the original anonymized CT series. The annotations were reviewed according to internal quality guidelines. Each annotation was reviewed by a second, more experienced user.

For abnormality pattern segmentation training, the ground truth for each training dataset was generated by expert users with a custom annotation tool. The user loaded anonymized 3D CT series (volumes) and, if provided, a pre-computed mask to initialize the annotation. The annotator would then edit the mask and mark abnormality patterns such as, e.g., GGO, consolidation, and crazy paving, with a pre-specified label. The final mask was saved as a file together with the reference to the original anonymized CT series. The annotations were reviewed according to internal quality guidelines. Each annotation was reviewed by a board certified radiologist. The pre-computed masks were produced by previously trained networks. Only cases a priori identified as lesion-positive were sent for annotation.

For abnormality pattern segmentation testing, the ground truth was generated using the same approach as for the training data. In order to perform an inter-rater variability study, 13 random chest CT datasets from patients diagnosed with COVID-19 were given to two clinical experts for manual annotations. These 13 cases were randomly selected from the testing dataset of COVID-198 positive patients.

Figure 10:
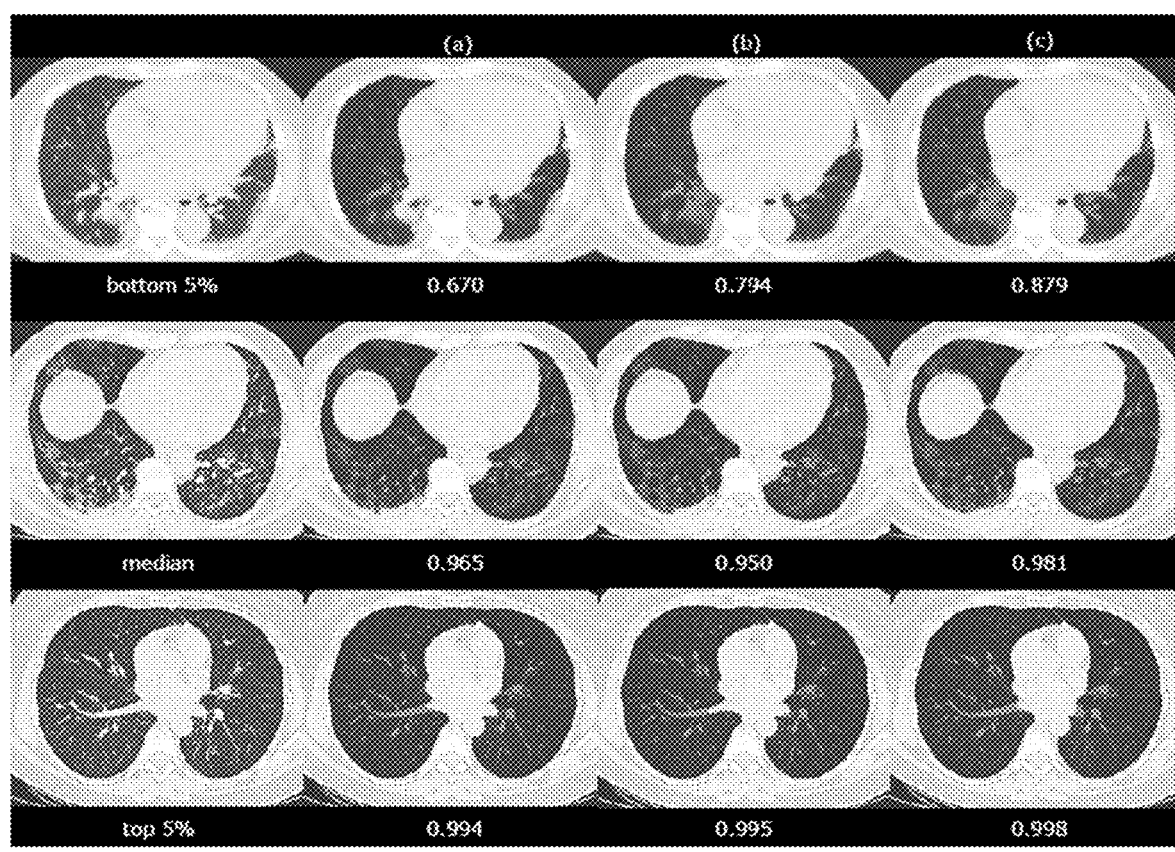
FIG. 10 shows qualitative results comparing various methods of lung segmentation.
Figure 11:
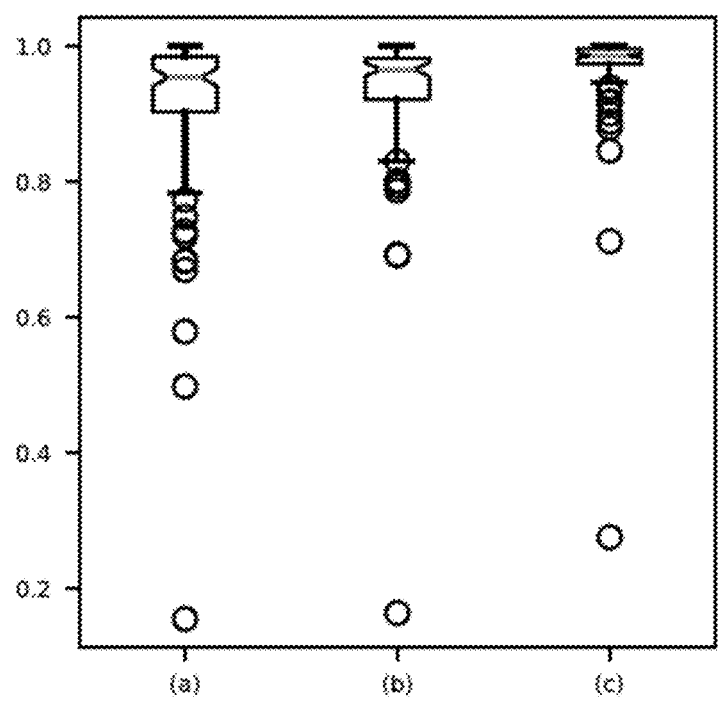
FIG. 11 shows a graph comparing a lesion inclusion rate for various methods of lung segmentation.

Lung segmentation is used for abnormality pattern segmentation. Accordingly, it is important to have the abnormality region fully covered by the lung segmentation. The performance of different segmentation methods for the inclusion of abnormality patterns in the lung mask was not captured by the traditional metrics, such as Dice similarity coefficient and average surface distance. Therefore, a new metric is introduced, called the lesion inclusion rate, i.e., $LIR=|S_{lesion} \cap S_{lung}|/S_{lung}$. The LIR was computed for three lung segmentation methods: (a) one only trained with non-pneumonia data, (b) one fine-tuned with pneumonia data, and (c) one trained with both pneumonia data and COVID-like synthetic data generated according to embodiments described herein along with some tailored adjustments to account for the synthetic data. FIG. 10 shows qualitative results 1000 of lung segmentation on example cases with bottom 5%, median, and top 5% lesion inclusion rate using lung segmentation methods (a), (b), and (c) described above. FIG. 11 shows a graph 1100 of a boxplot of the lesion inclusion rate for lung segmentation methods (a), (b), and (c) described above. The y-axis of graph 1100 indicates the percentile of how much lesion segmentation has been included in the predicted lung segmentation (ideally 100%).

From both the qualitative results shown in FIG. 10 and the quantitative results shown in FIG. 11, it can be seen that the methods trained with high abnormality pattern data demonstrate better robustness in covering the lung regions with COVID-19 abnormality patterns. Without explicitly training on COVID-19 cases, an average LIR of 0.968 is achieved across 100 COVID-19 positive cases through synthesis of images of COVID-19 abnormality patterns according to embodiments described herein and associated model training adjustments, compared to an average LIR of 0.913 from a baseline method previously trained over 8000 images.

Figure 12:
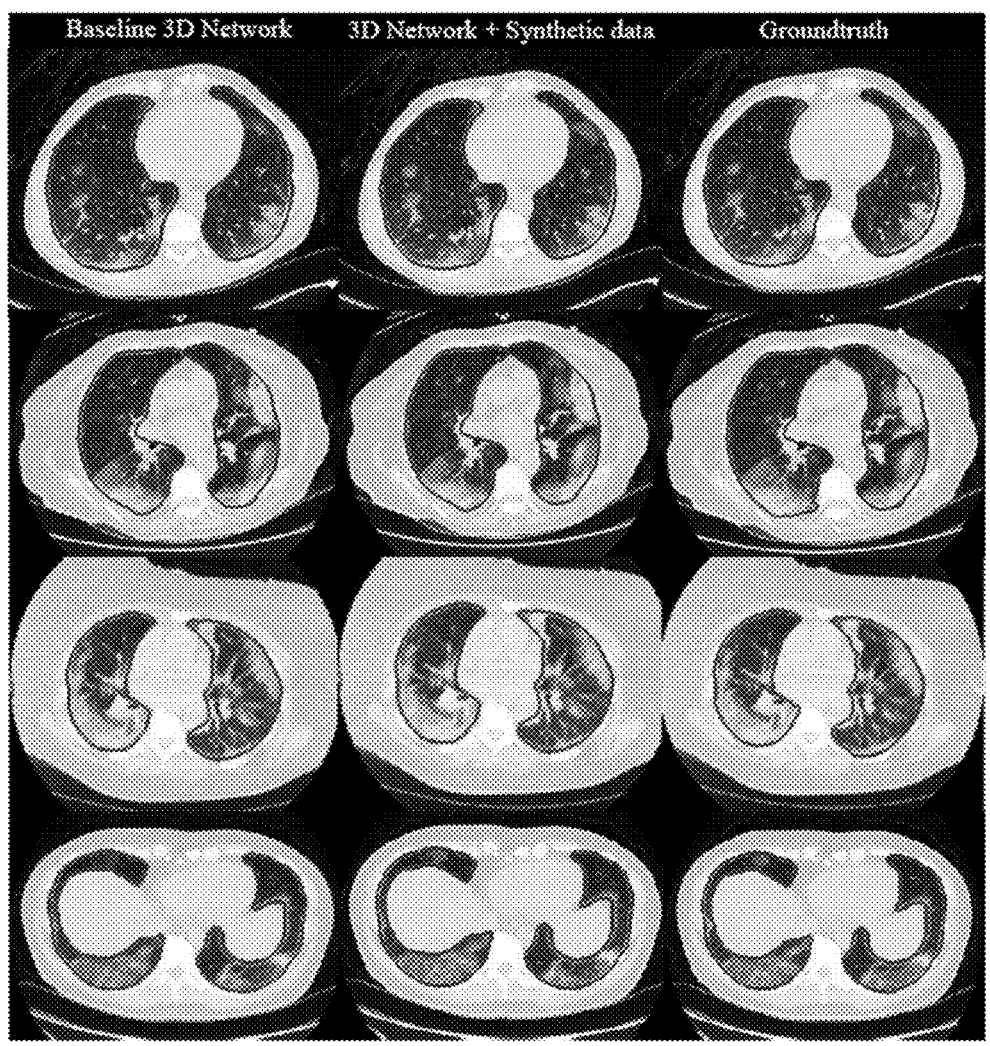
FIG. 12 shows a comparison of slices output by a baseline 3D network, a 3D network trained with synthesized images according to embodiments described herein, and ground truth images.

FIG. 12 shows a comparison 1200 of slices output by a baseline 3D network, a 3D network trained with synthesized images according to embodiments described herein, and ground truth images. Compared to the ground truth, the 3D lesion segmentation network tends to miss small GGO components as well as the pleura consolidations. Observing from the middle column of FIG. 12, the synthesis augmented network (3D network+synthetic data) has higher sensitivity for such challenging regions without producing extra false positives.

The severity of COVID-19 was measured in each subject from the predicted segmentation mask by DSC (DICE similarity coefficient), PO (percentage of opacity), and PHO (percentage of high opacity). The percent of opacity is calculated as the total percent volume of the lung parenchyma that is affected by disease:

$$PO = 100 \times \frac{\text{volume of predicted abnormalities}}{\text{volume of lung mask}}. \quad \text{(Equation 9)}$$

The percentage of high opacity is calculated as the total percentage volume of the lung parenchyma that is affected by severe disease, i.e., high opacity regions including consolidation:

$$PHO = 100 \times \frac{\text{volume of high opacity region}}{\text{volume of lung mask}}. \quad \text{(Equation 10)}$$

FIG. 13 shows a table 1300 summarizing DSC, PO, and PHO metrics measured on 100 COVID-19 positive and 100 control testing subjects to evaluate the ability of segmentation networks for predicting disease severity. 8 different abnormality segmentation strategies were evaluated by comparing the following methods: the lung segmentation network fine-tuned on pneumonia images (Pneumonia Fine-tuned) vs. the lung segmentation network trained on pneumonia images and synthetic images (Pneumonia Fine-tuned+Syn), the 2D segmentation network (2D) vs. the 3D segmentation network (3D), and the segmentation network trained without synthetic images and the segmentation network trained with synthetic images (20% of total training images). Using the DSC, PO, and PHO metrics, the user variability between different readers was estimated with 13 COVID-19 positive cases. FIG. 14 shows a table 14 showing the variability between different readers. DSC and Pearson's correlation coefficient (PCC) between two sets of annotated disease severity measures were used to estimate the user variability for 13 COVID-19 test cases.

The generator network was trained with 227 COVID-19 positive cases. The impact of adding synthesized data to the lung and abnormality segmentation networks were evaluated on a benchmark dataset of 100 COVID-19 positive patients and 100 control subjects. It was found that the addition of synthesized data improved LIR by 6.02%. Next, the improvement of the abnormality segmentation was evaluated with the addition of synthesized data. The DSC of the 2D network was found to have improved from 0.623 to 0.645 and the DSC of the 3D network improved from 0.657 to 0.706, which is comparable to the inter-user variability DSC (0.7132±0.1831). Finally, it was found that the Pearson's correlation coefficient between the ground truth and predict metrics improved with networks using synthesized data. The PCC for the PO improved from 0.908 to 0.939 for the 2D network and 0.933 to 0.961 for the 3D network, which is comparable to the inter-user variability range (PCC=0.957). Similarly, the PCC for the PHO improved from 0.906 to 0.927 for the 2D network and 0.9099 to 0.9387 for the 3D network. Accordingly, it was demonstrated that the addition of synthesized data, generated according to embodiments described herein, improved the quality of lung segmentation by including the regions of high abnormality patterns, which also translates to an improvement in abnormality segmentation.

Embodiments described herein are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the providing system.

Furthermore, embodiments described herein are described with respect to methods and systems for medical image synthesis of abnormality patterns associated with a disease using a trained machine learning based generator network, as well as with respect to methods and systems for training a machine learning based generator network for generating synthesized medical images of abnormality patterns associated with a disease. Features, advantages or alternative embodiments herein can be assigned to the other claimed objects and vice versa. In other words, claims for methods and systems for training a machine learning based generator network can be improved with features described or claimed in context of the methods and systems for utilizing a trained machine learning based generator network, and vice versa.

In particular, the trained machine learning based generator network of the methods and systems for medical image synthesis of abnormality patterns associated with a disease can adapted by the methods and systems for training the machine learning based generator network for generating synthesized medical images of abnormality patterns associated with a disease. Furthermore, the input data of the trained machine learning based generator network can comprise advantageous features and embodiments of the training input data, and vice versa. Furthermore, the output data of the trained machine learning based generator network can comprise advantageous features and embodiments of the output training data, and vice versa.

In general, a trained machine learning based network mimics cognitive functions that humans associate with other human minds. In particular, by training based on training data, the trained machine learning based network is able to adapt to new circumstances and to detect and extrapolate patterns.

In general, parameters of a machine learning based network can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained machine learning based network can be adapted iteratively by several steps of training.

In particular, a trained machine learning based network can comprise a neural network, a support vector machine, a decision tree, and/or a Bayesian network, and/or the trained machine learning based network can be based on k-means clustering, Q-learning, genetic algorithms, and/or association rules. In particular, a neural network can be a deep neural network, a convolutional neural network, or a convolutional deep neural network. Furthermore, a neural network can be an adversarial network, a deep adversarial network and/or a generative adversarial network.

Figure 15:
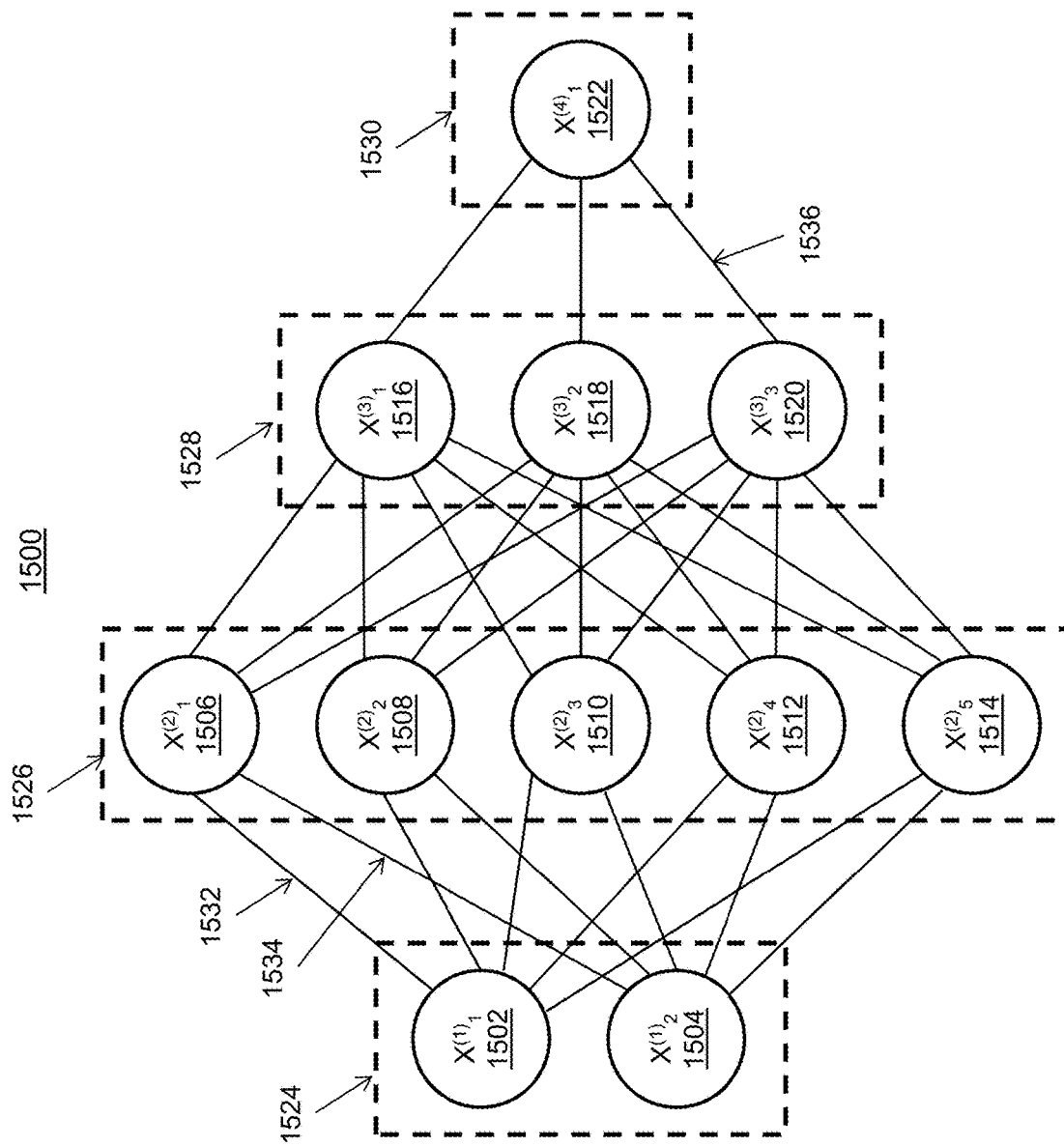
FIG. 15 shows an exemplary artificial neural network that may be used to implement one or more embodiments described herein.

FIG. 15 shows an embodiment of an artificial neural network 1500, in accordance with one or more embodiments. Alternative terms for "artificial neural network" are "neural network", "artificial neural net" or "neural net". Machine learning networks described herein, such as, e.g., the machine learning based generator network applied at step 108 of FIG. 1, generator network 208 of FIG. 2, and generator network 808 and discriminator network 812 of FIG. 8, may be implemented using artificial neural network 1500.

The artificial neural network 1500 comprises nodes 1502-1522 and edges 1532, 1534, . . . , 1536, wherein each edge 1532, 1534, . . . , 1536 is a directed connection from a first node 1502-1522 to a second node 1502-1522. In general, the first node 1502-1522 and the second node 1502-1522 are different nodes 1502-1522, it is also possible that the first node 1502-1522 and the second node 1502-1522 are identical. For example, in FIG. 15, the edge 1532 is a directed connection from the node 1502 to the node 1506, and the edge 1534 is a directed connection from the node 1504 to the node 1506. An edge 1532, 1534, . . . , 1536 from a first node 1502-1522 to a second node 1502-1522 is also denoted as "ingoing edge" for the second node 1502-1522 and as "outgoing edge" for the first node 1502-1522.

In this embodiment, the nodes 1502-1522 of the artificial neural network 1500 can be arranged in layers 1524-1530, wherein the layers can comprise an intrinsic order introduced by the edges 1532, 1534, . . . , 1536 between the nodes 1502-1522. In particular, edges 1532, 1534, . . . , 1536 can exist only between neighboring layers of nodes. In the embodiment shown in FIG. 15, there is an input layer 1524 comprising only nodes 1502 and 1504 without an incoming edge, an output layer 1530 comprising only node 1522 without outgoing edges, and hidden layers 1526, 1528 in-between the input layer 1524 and the output layer 1530. In general, the number of hidden layers 1526, 1528 can be chosen arbitrarily. The number of nodes 1502 and 1504 within the input layer 1524 usually relates to the number of input values of the neural network 1500, and the number of nodes 1522 within the output layer 1530 usually relates to the number of output values of the neural network 1500.

In particular, a (real) number can be assigned as a value to every node 1502-1522 of the neural network 1500. Here, $x^{(n)}_i$ denotes the value of the i-th node 1502-1522 of the n-th layer 1524-1530. The values of the nodes 1502-1522 of the input layer 1524 are equivalent to the input values of the neural network 1500, the value of the node 1522 of the output layer 1530 is equivalent to the output value of the neural network 1500. Furthermore, each edge 1532, 1534, . . . , 1536 can comprise a weight being a real number, in particular, the weight is a real number within the interval [−1, 1] or within the interval [0, 1]. Here, $w^{(m,n)}_{i,j}$ denotes the weight of the edge between the i-th node 1502-1522 of the m-th layer 1524-1530 and the j-th node 1502-1522 of the n-th layer 1524-1530. Furthermore, the abbreviation $w^{(n)}_{i,j}$ is defined for the weight $w^{(n, n+1)}_{i,j}$.

In particular, to calculate the output values of the neural network 1500, the input values are propagated through the neural network. In particular, the values of the nodes 1502-1522 of the (n+1)-th layer 1524-1530 can be calculated based on the values of the nodes 1502-1522 of the n-th layer 1524-1530 by $$x_j^{(n+1)} = f(\Sigma_i x_i^{(n)} \cdot w_{i,j}^{(n)}).$$

Herein, the function f is a transfer function (another term is "activation function"). Known transfer functions are step functions, sigmoid function (e.g. the logistic function, the generalized logistic function, the hyperbolic tangent, the Arctangent function, the error function, the smoothstep function) or rectifier functions The transfer function is mainly used for normalization purposes.

In particular, the values are propagated layer-wise through the neural network, wherein values of the input layer 1524 are given by the input of the neural network 1500, wherein values of the first hidden layer 1526 can be calculated based on the values of the input layer 1524 of the neural network, wherein values of the second hidden layer 1528 can be calculated based in the values of the first hidden layer 1526, etc.

In order to set the values $w^{(m,n)}_{i,j}$ for the edges, the neural network 1500 has to be trained using training data. In particular, training data comprises training input data and training output data (denoted as $t_j$). For a training step, the neural network 1500 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 1500 (backpropagation algorithm). In particular, the weights are changed according to $$w'^{(n)}_{i,j} = w^{(n)}_{i,j} - \gamma \cdot \delta_j^{(n)} \cdot x_i^{(n)}$$

wherein γ is a learning rate, and the numbers $\delta^{(n)}_j$ can be recursively calculated as $$\delta_j^{(n)} = (\Sigma_k \delta_k^{(n+1)} \cdot w_{j,k}^{(n+1)}) \cdot f'(\Sigma_i x_i^{(n)} \cdot w_{i,j}^{(n)})$$

based on $\delta^{(n+1)}_j$, if the (n+1)-th layer is not the output layer, and $$\delta_j^{(n)} = (x_k^{(n+1)} - t_j^{(n+1)}) \cdot f'(\Sigma_i x_i^{(n)} \cdot w_{i,j}^{(n)})$$

if the (n+1)-th layer is the output layer 1530, wherein f' is the first derivative of the activation function, and $y^{(n+1)}_j$ is the comparison training value for the j-th node of the output layer 1530.

Figure 16:
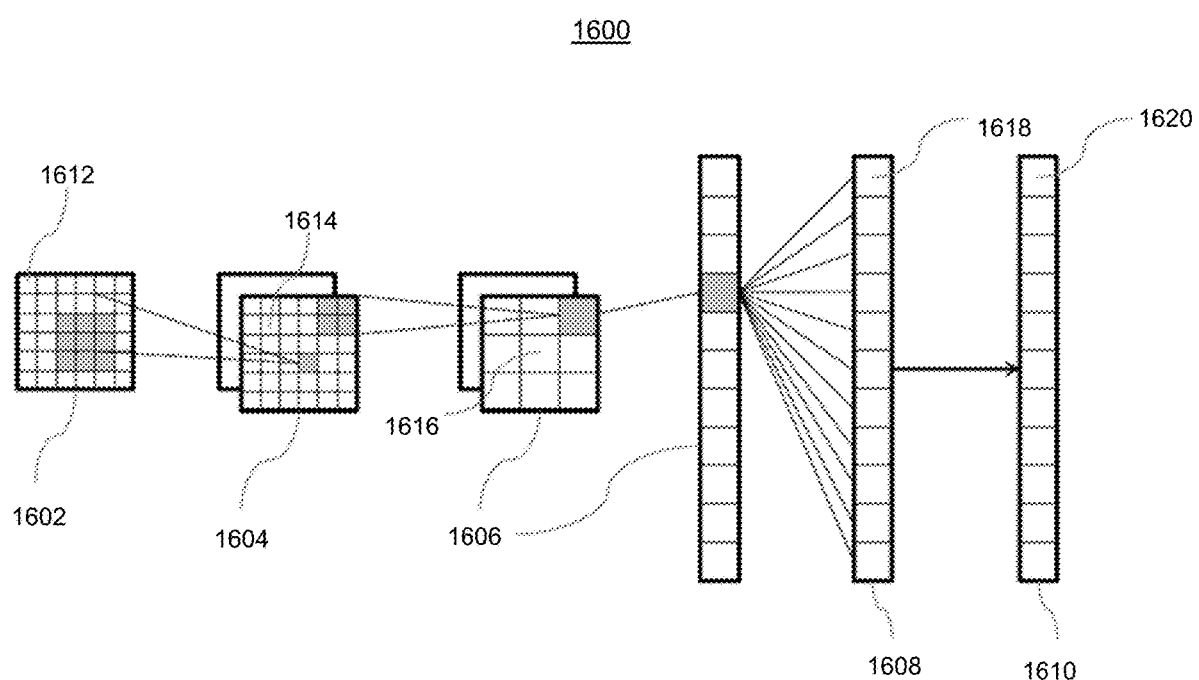
FIG. 16 shows a convolutional neural network that may be used to implement one or more embodiments described herein.

FIG. 16 shows a convolutional neural network 1600, in accordance with one or more embodiments. Machine learning networks described herein, such as, e.g., the machine learning based generator network applied at step 108 of FIG. 1, generator network 208 of FIG. 2, and generator network 808 and discriminator network 812 of FIG. 8, may be implemented using convolutional neural network 1600.

In the embodiment shown in FIG. 16, the convolutional neural network comprises 1600 an input layer 1602, a convolutional layer 1604, a pooling layer 1606, a fully connected layer 1608, and an output layer 1610. Alternatively, the convolutional neural network 1600 can comprise several convolutional layers 1604, several pooling layers 1606, and several fully connected layers 1608, as well as other types of layers. The order of the layers can be chosen arbitrarily, usually fully connected layers 1608 are used as the last layers before the output layer 1610.

In particular, within a convolutional neural network 1600, the nodes 1612-1620 of one layer 1602-1610 can be considered to be arranged as a d-dimensional matrix or as a d-dimensional image. In particular, in the two-dimensional case the value of the node 1612-1620 indexed with i and j in the n-th layer 1602-1610 can be denoted as $x^{(n)}_{[i,j]}$. However, the arrangement of the nodes 1612-1620 of one layer 1602-1610 does not have an effect on the calculations executed within the convolutional neural network 1600 as such, since these are given solely by the structure and the weights of the edges.

In particular, a convolutional layer 1604 is characterized by the structure and the weights of the incoming edges forming a convolution operation based on a certain number of kernels. In particular, the structure and the weights of the incoming edges are chosen such that the values $x^{(n)}_k$ of the nodes 1614 of the convolutional layer 1604 are calculated as a convolution $x^{(n)}_k = K_k * x^{(n-1)}$ based on the values $x^{(n-1)}$ of the nodes 1612 of the preceding layer 1602, where the convolution * is defined in the two-dimensional case as $$x_k^{(n)}[i,j] = (K_k * x^{(n-1)})[i,j] = \Sigma_{i'} \Sigma_{j'} K_k[i',j'] \cdot x^{(n-1)}[i-i', j-j'].$$

Here the k-th kernel $K_k$ is a d-dimensional matrix (in this embodiment a two-dimensional matrix), which is usually small compared to the number of nodes 1612-1618 (e.g. a 3×3 matrix, or a 5×5 matrix). In particular, this implies that the weights of the incoming edges are not independent, but chosen such that they produce said convolution equation. In particular, for a kernel being a 3×3 matrix, there are only 9 independent weights (each entry of the kernel matrix corresponding to one independent weight), irrespectively of the number of nodes 1612-1620 in the respective layer 1602-1610. In particular, for a convolutional layer 1604, the number of nodes 1614 in the convolutional layer is equivalent to the number of nodes 1612 in the preceding layer 1602 multiplied with the number of kernels.

If the nodes 1612 of the preceding layer 1602 are arranged as a d-dimensional matrix, using a plurality of kernels can be interpreted as adding a further dimension (denoted as "depth" dimension), so that the nodes 1614 of the convolutional layer 1614 are arranged as a (d+1)-dimensional matrix. If the nodes 1612 of the preceding layer 1602 are already arranged as a (d+1)-dimensional matrix comprising a depth dimension, using a plurality of kernels can be interpreted as expanding along the depth dimension, so that the nodes 1614 of the convolutional layer 1604 are arranged also as a (d+1)-dimensional matrix, wherein the size of the (d+1)-dimensional matrix with respect to the depth dimension is by a factor of the number of kernels larger than in the preceding layer 1602.

The advantage of using convolutional layers 1604 is that spatially local correlation of the input data can exploited by enforcing a local connectivity pattern between nodes of adjacent layers, in particular by each node being connected to only a small region of the nodes of the preceding layer.

In embodiment shown in FIG. 16, the input layer 1602 comprises 36 nodes 1612, arranged as a two-dimensional 6×6 matrix. The convolutional layer 1604 comprises 72 nodes 1614, arranged as two two-dimensional 6×6 matrices, each of the two matrices being the result of a convolution of the values of the input layer with a kernel. Equivalently, the nodes 1614 of the convolutional layer 1604 can be interpreted as arranges as a three-dimensional 6×6×2 matrix, wherein the last dimension is the depth dimension.

A pooling layer 1606 can be characterized by the structure and the weights of the incoming edges and the activation function of its nodes 1616 forming a pooling operation based on a non-linear pooling function f. For example, in the two dimensional case the values $x^{(n)}$ of the nodes 1616 of the pooling layer 1606 can be calculated based on the values $x^{(n-1)}$ of the nodes 1614 of the preceding layer 1604 as $$x^{(n)}[i,j]=f(x^{(n-1)}[id_1,jd_2], \ldots ,x^{(n-1)}[id_1+d_1-1,jd_2+d_2-1])$$

In other words, by using a pooling layer 1606, the number of nodes 1614, 1616 can be reduced, by replacing a number d1·d2 of neighboring nodes 1614 in the preceding layer 1604 with a single node 1616 being calculated as a function of the values of said number of neighboring nodes in the pooling layer. In particular, the pooling function f can be the max-function, the average or the L2-Norm. In particular, for a pooling layer 1606 the weights of the incoming edges are fixed and are not modified by training.

The advantage of using a pooling layer 1606 is that the number of nodes 1614, 1616 and the number of parameters is reduced. This leads to the amount of computation in the network being reduced and to a control of overfitting.

In the embodiment shown in FIG. 16, the pooling layer 1606 is a max-pooling, replacing four neighboring nodes with only one node, the value being the maximum of the values of the four neighboring nodes. The max-pooling is applied to each d-dimensional matrix of the previous layer; in this embodiment, the max-pooling is applied to each of the two two-dimensional matrices, reducing the number of nodes from 72 to 18.

A fully-connected layer 1608 can be characterized by the fact that a majority, in particular, all edges between nodes 1616 of the previous layer 1606 and the nodes 1618 of the fully-connected layer 1608 are present, and wherein the weight of each of the edges can be adjusted individually.

In this embodiment, the nodes 1616 of the preceding layer 1606 of the fully-connected layer 1608 are displayed both as two-dimensional matrices, and additionally as non-related nodes (indicated as a line of nodes, wherein the number of nodes was reduced for a better presentability). In this embodiment, the number of nodes 1618 in the fully connected layer 1608 is equal to the number of nodes 1616 in the preceding layer 1606. Alternatively, the number of nodes 1616, 1618 can differ.

Furthermore, in this embodiment, the values of the nodes 1620 of the output layer 1610 are determined by applying the Softmax function onto the values of the nodes 1618 of the preceding layer 1608. By applying the Softmax function, the sum the values of all nodes 1620 of the output layer 1610 is 1, and all values of all nodes 1620 of the output layer are real numbers between 0 and 1.

A convolutional neural network 1600 can also comprise a ReLU (rectified linear units) layer. In particular, the number of nodes and the structure of the nodes contained in a ReLU layer is equivalent to the number of nodes and the structure of the nodes contained in the preceding layer. In particular, the value of each node in the ReLU layer is calculated by applying a rectifying function to the value of the corresponding node of the preceding layer. Examples for rectifying functions are $f(x)=\max(0,x)$, the tangent hyperbolics function or the sigmoid function.

In particular, convolutional neural networks 1600 can be trained based on the backpropagation algorithm. For preventing overfitting, methods of regularization can be used, e.g. dropout of nodes 1612-1620, stochastic pooling, use of artificial data, weight decay based on the L1 or the L2 norm, or max norm constraints.

Systems, apparatuses, and methods described herein, including machine learning based networks, such as, e.g., generator network 208 of FIG. 2, generator network 808 and discriminator network 812 of FIG. 8, artificial neural network 1500 of FIG. 15, and convolutional neural network 1600 of FIG. 16, may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIGS. 1-2 and 8. Certain steps or functions of the methods and workflows described herein, including one or more of the steps or functions of FIGS. 1-2 and 8, may be performed by a server or by another processor in a network-based cloud-computing system. Certain steps or functions of the methods and workflows described herein, including one or more of the steps of FIGS. 1-2 and 8, may be performed by a client computer in a network-based cloud computing system. The steps or functions of the methods and workflows described herein, including one or more of the steps of FIGS. 1-2 and 8, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIGS. 1-2 and 8, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 17:
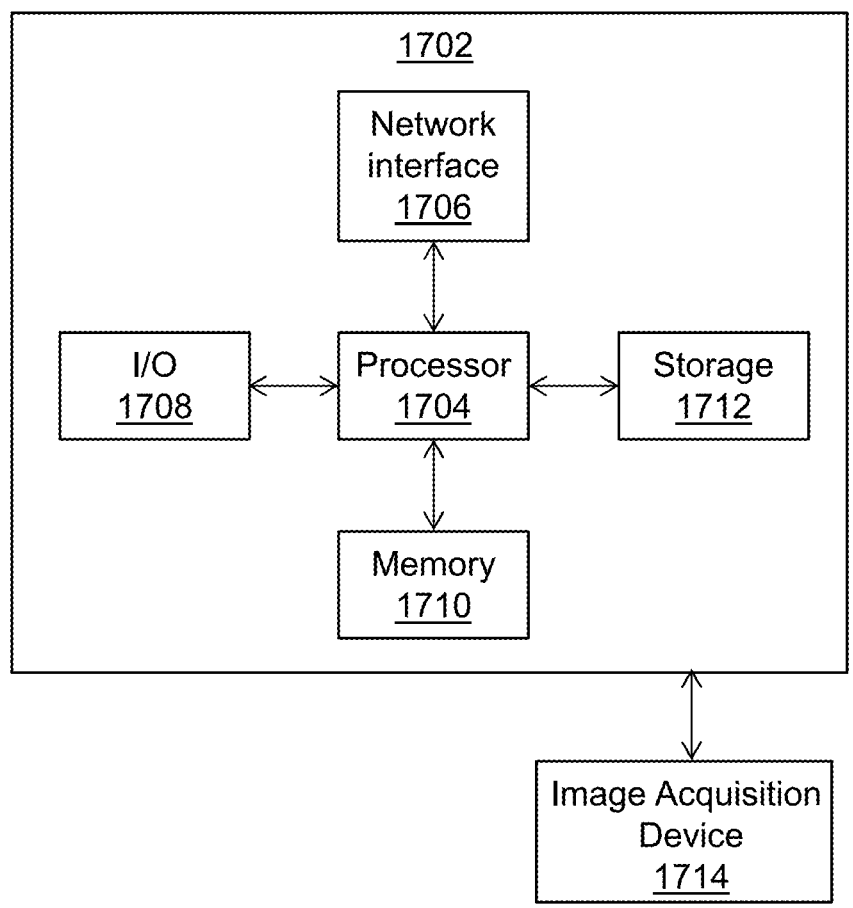
FIG. 17 shows a high-level block diagram of a computer that may be used to implement one or more embodiments described herein.

A high-level block diagram of an example computer 1702 that may be used to implement systems, apparatus, and methods described herein is depicted in FIG. 17. Computer 1702 includes a processor 1704 operatively coupled to a data storage device 1712 and a memory 1710. Processor 1704 controls the overall operation of computer 1702 by executing computer program instructions that define such operations. The computer program instructions may be stored in data storage device 1712, or other computer readable medium, and loaded into memory 1710 when execution of the computer program instructions is desired. Thus, the method and workflow steps or functions of FIGS. 1-2 and 8 can be defined by the computer program instructions stored in memory 1710 and/or data storage device 1712 and controlled by processor 1704 executing the computer program instructions. For example, the computer program instructions can be implemented as computer executable code programmed by one skilled in the art to perform the method and workflow steps or functions of FIGS. 1-2 and 8. Accordingly, by executing the computer program instructions, the processor 1704 executes the method and workflow steps or functions of FIGS. 1-2 and 8. Computer 1702 may also include one or more network interfaces 1706 for communicating with other devices via a network. Computer 1702 may also include one or more input/output devices 1708 that enable user interaction with computer 1702 (e.g., display, keyboard, mouse, speakers, buttons, etc.).

Processor 1704 may include both general and special purpose microprocessors, and may be the sole processor or one of multiple processors of computer 1702. Processor 1704 may include one or more central processing units (CPUs), for example. Processor 1704, data storage device 1712, and/or memory 1710 may include, be supplemented by, or incorporated in, one or more application-specific integrated circuits (ASICs) and/or one or more field programmable gate arrays (FPGAs).

Data storage device 1712 and memory 1710 each include a tangible non-transitory computer readable storage medium. Data storage device 1712, and memory 1710, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1708 may include peripherals, such as a printer, scanner, display screen, etc. For example, input/output devices 1708 may include a display device such as a cathode ray tube (CRT) or liquid crystal display (LCD) monitor for displaying information to the user, a keyboard, and a pointing device such as a mouse or a trackball by which the user can provide input to computer 1702.

An image acquisition device 1714 can be connected to the computer 1702 to input image data (e.g., medical images) to the computer 1702. It is possible to implement the image acquisition device 1714 and the computer 1702 as one device. It is also possible that the image acquisition device 1714 and the computer 1702 communicate wirelessly through a network. In a possible embodiment, the computer 1702 can be located remotely with respect to the image acquisition device 1714.

Any or all of the systems and apparatus discussed herein may be implemented using one or more computers such as computer 1702.

One skilled in the art will recognize that an implementation of an actual computer or computer system may have other structures and may contain other components as well, and that FIG. 17 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer implemented method comprising:
receiving an input medical image;
generating a synthesized segmentation mask by:
sampling locations from a spatial probability map of abnormality patterns of a disease,
mapping the sampled locations from the spatial probability map to an image space of the synthesized segmentation mask,
generating individual masks each corresponding to a connected component region and positioned at a respective location of the mapped sampled locations in the image space of the synthesized segmentation mask, and
combining the individual masks to generate the synthesized segmentation mask;
masking the input medical image based on the synthesized segmentation mask, the masked input medical image having an unmasked portion and a masked portion;
generating an initial synthesized medical image using a trained machine learning based generator network, the initial synthesized medical image comprising a synthesized version of the unmasked portion of the masked input medical image and synthesized abnormality patterns of the disease in the masked portion of the masked input medical image;
blending the initial synthesized medical image with the input medical image to generate a blended image; and
fusing the synthesized abnormality patterns extracted from the blended image with the input medical image to generate a final synthesized medical image.

2. The computer implemented method of claim 1, wherein the disease is COVID-19 (coronavirus disease 2019) and the synthesized abnormality patterns comprise one or more of ground glass opacities (GGO), consolidation, and crazy-paving pattern.

3. The computer implemented method of claim 1, wherein the disease is at least one of a viral pneumonia, a bacterial pneumonia, a fungal pneumonia, and a mycoplasma pneumonia.

4. The computer implemented method of claim 1, wherein generating individual masks each corresponding to a connected component region and positioned at a respective location of the mapped sampled locations in the image space of the synthesized segmentation mask comprises:
for each of the individual masks:
selecting a number of points on a surface of a mesh of a sphere; and
applying a transformation to each particular point, wherein the transformation applied to a particular point is propagated to neighboring vertices on the surface of the mesh based on a distance between the particular point and each of the neighboring vertices as compared to a distance threshold.

5. The computer implemented method of claim 1, wherein fusing the synthesized abnormality patterns extracted from the blended image with the input medical image to generate a final synthesized medical image comprises:
smoothing boundaries of the synthesized segmentation mask to generate a smooth synthesized segmentation mask;
cropping masked portions of the smooth synthesized segmentation mask from the blended image to extract the synthesized abnormality patterns;
cropping unmasked portions of the smooth synthesized segmentation mask from the input medical image to extract remaining regions of the input medical image; and
combining the extracted synthesized abnormality patterns and the extracted remaining regions.

6. The computer implemented method of claim 1, further comprising:
training a machine learning based system for performing a medical image analysis task based on the final synthesized medical image.

7. An apparatus comprising:
means for receiving an input medical image;
means for generating a synthesized segmentation mask by:
means for sampling locations from a spatial probability map of abnormality patterns of a disease,
means for mapping the sampled locations from the spatial probability map to an image space of the synthesized segmentation mask,
means for generating individual masks each corresponding to a connected component region and positioned at a respective location of the mapped sampled locations in the image space of the synthesized segmentation mask, and
means for combining the individual masks to generate the synthesized segmentation mask;
means for masking the input medical image based on the synthesized segmentation mask, the masked input medical image having an unmasked portion and a masked portion;
means for generating an initial synthesized medical image using a trained machine learning based generator network, the initial synthesized medical image comprising a synthesized version of the unmasked portion of the masked input medical image and synthesized abnormality patterns of the disease in the masked portion of the masked input medical image;
means for blending the initial synthesized medical image with the input medical image to generate a blended image; and
means for fusing the synthesized abnormality patterns extracted from the blended image with the input medical image to generate a final synthesized medical image.

8. The apparatus of claim 7, wherein the disease is COVID-19 (coronavirus disease 2019) and the synthesized abnormality patterns comprise one or more of ground glass opacities (GGO), consolidation, and crazy-paving pattern.

9. The apparatus of claim 7, wherein the means for generating individual masks each corresponding to a connected component region and positioned at a respective location of the mapped sampled locations in the image space of the synthesized segmentation mask comprises:
means for selecting, for each of the individual masks, a number of points on a surface of a mesh of a sphere; and
means for applying, for each of the individual masks, a transformation to each particular point, wherein the transformation applied to a particular point is propagated to neighboring vertices on the surface of the mesh based on a distance between the particular point and each of the neighboring vertices as compared to a distance threshold.

10. A non-transitory computer readable medium storing computer program instructions, the computer program instructions when executed by a processor cause the processor to perform operations comprising:
receiving an input medical image;
generating a synthesized segmentation mask by:
sampling locations from a spatial probability map of abnormality patterns of a disease,
mapping the sampled locations from the spatial probability map to an image space of the synthesized segmentation mask.
generating individual masks each corresponding to a connected component region and positioned at a respective location of the mapped sampled locations in the image space of the synthesized segmentation mask, and
combining the individual masks to generate the synthesized segmentation mask;
masking the input medical image based on the synthesized segmentation mask, the masked input medical image having an unmasked portion and a masked portion;
generating an initial synthesized medical image using a trained machine learning based generator network, the initial synthesized medical image comprising a synthesized version of the unmasked portion of the masked input medical image and synthesized abnormality patterns of the disease in the masked portion of the masked input medical image;
blending the initial synthesized medical image with the input medical image to generate a blended image; and
fusing the synthesized abnormality patterns extracted from the blended image with the input medical image to generate a final synthesized medical image.

11. The non-transitory computer readable medium of claim 10, wherein the disease is COVID-19 (coronavirus disease 2019) and the synthesized abnormality patterns comprise one or more of ground glass opacities (GGO), consolidation, and crazy-paving pattern.

12. The non-transitory computer readable medium of claim 10, wherein fusing the synthesized abnormality patterns extracted from the blended image with the input medical image to generate a final synthesized medical image comprises:
smoothing boundaries of the synthesized segmentation mask to generate a smooth synthesized segmentation mask;
cropping masked portions of the smooth synthesized segmentation mask from the blended image to extract the synthesized abnormality patterns;
cropping unmasked portions of the smooth synthesized segmentation mask from the input medical image to extract remaining regions of the input medical image; and
combining the extracted synthesized abnormality patterns and the extracted remaining regions.

13. The non-transitory computer readable medium of claim 10, the operations further comprising:
training a machine learning based system for performing a medical image analysis task based on the final synthesized medical image.

* * * * *